(12) United States Patent
Maggiore et al.

(10) Patent No.: US 10,057,699 B2
(45) Date of Patent: Aug. 21, 2018

(54) AUDIO IDENTIFICATION DEVICE, AUDIO IDENTIFICATION METHOD AND AUDIO IDENTIFICATION SYSTEM

(71) Applicant: Sartorius Stedim Biotech GmbH, Goettingen (DE)

(72) Inventors: Frank Maggiore, Port Jefferson Station, NY (US); Paul Priebe, Smithtown, NY (US)

(73) Assignee: Sartorius Stedim Biotech GmbH (DE)

( * ) Notice: Subject to any disclaimer, the term of this patent is extended or adjusted under 35 U.S.C. 154(b) by 221 days.

(21) Appl. No.: 14/503,533

(22) Filed: Oct. 1, 2014

(65) Prior Publication Data
US 2016/0100265 A1 Apr. 7, 2016

(51) Int. Cl.
| | |
|---|---|
| H04R 29/00 | (2006.01) |
| G01S 3/801 | (2006.01) |
| G06F 17/30 | (2006.01) |
| G01M 13/02 | (2006.01) |

(52) U.S. Cl.
CPC .......... *H04R 29/00* (2013.01); *G01M 13/028* (2013.01); *G01S 3/801* (2013.01); *G06F 17/3012* (2013.01); *G06F 17/30743* (2013.01); *G06F 17/30867* (2013.01)

(58) Field of Classification Search
CPC ...... H04R 29/00; G10M 10/028; G10S 3/801; G06F 17/3012; G06F 17/30743; G06F 17/30867
USPC ...................................................... 381/56, 58
See application file for complete search history.

(56) References Cited

U.S. PATENT DOCUMENTS

| | | | |
|---|---|---|---|
| 2007/0112563 A1 | 5/2007 | Krantz et al. | |
| 2009/0091441 A1* | 4/2009 | Schweitzer, III ... | G01M 13/028 340/531 |
| 2011/0211760 A1* | 9/2011 | Boncyk ............ | G06F 17/30259 382/190 |
| 2011/0288866 A1* | 11/2011 | Rasmussen ......... | H04L 12/1831 704/246 |
| 2013/0046714 A1* | 2/2013 | Harris ..................... | G01H 1/00 706/12 |
| 2013/0297256 A1* | 11/2013 | Yang ................... | G01M 13/028 702/183 |
| 2015/0310723 A1* | 10/2015 | Pinkerton ............ | G08B 21/182 340/870.09 |

FOREIGN PATENT DOCUMENTS

JP   201054234 A   3/2010

* cited by examiner

*Primary Examiner* — Vivian Chin
*Assistant Examiner* — Ammar Hamid
(74) *Attorney, Agent, or Firm* — Gerald E. Hespos; Michael J. Porco; Matthew T. Hespos

(57) ABSTRACT

An audio identification device is provided. The audio identification device comprises: at least one sensing device configured to capture an audio signal present in a working space of a processing setup including at least one processing device; and a processor configured to: receive information related to the at least one processing device; retrieve audio data stored in a database using the received information related to the at least one processing device; identify a state of the at least one processing device by analyzing the audio signal captured by the at least one sensing device based on the retrieved audio data; and output a response, the response being determined based on the identified state of the at least one processing device.

17 Claims, 22 Drawing Sheets

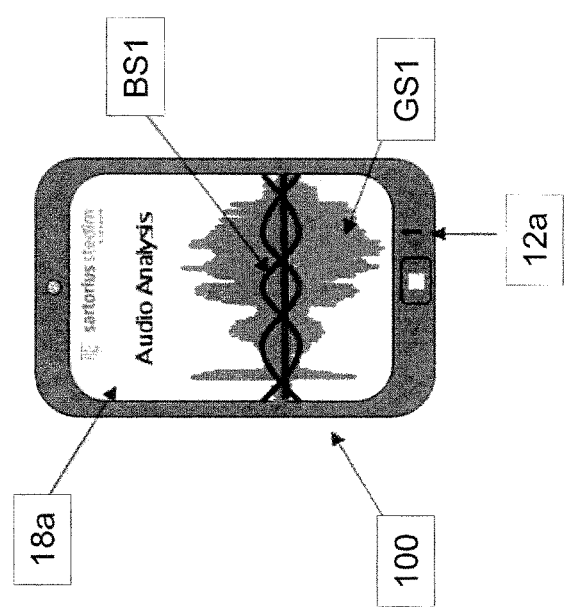
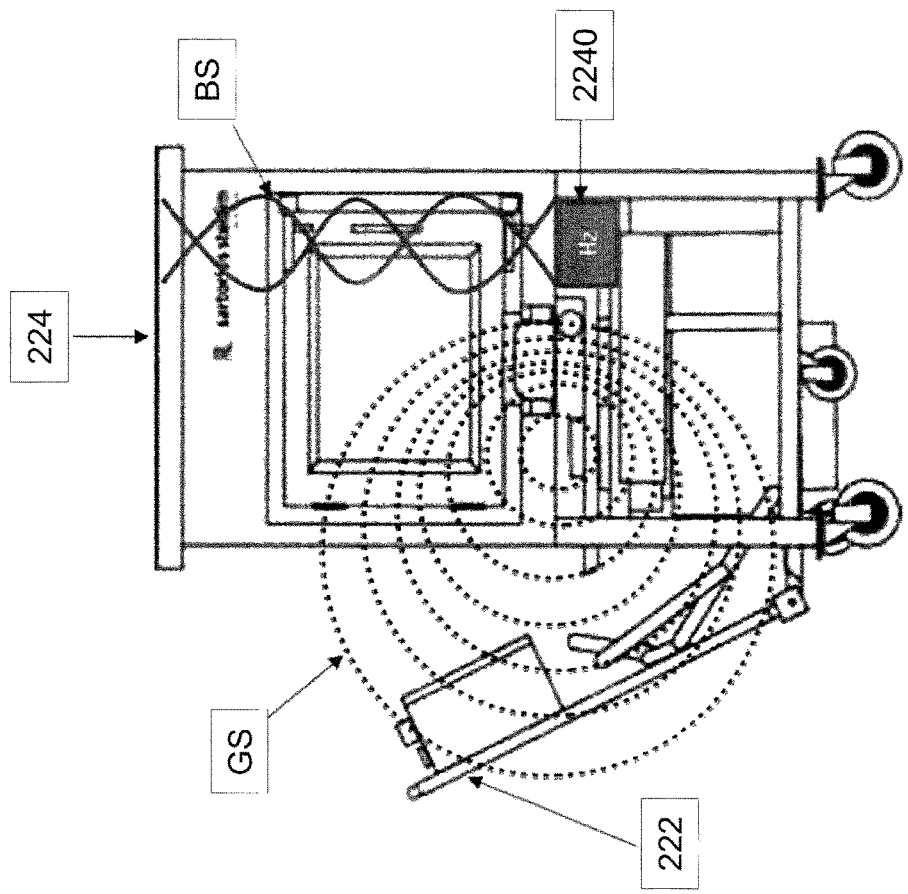
FIG. 4

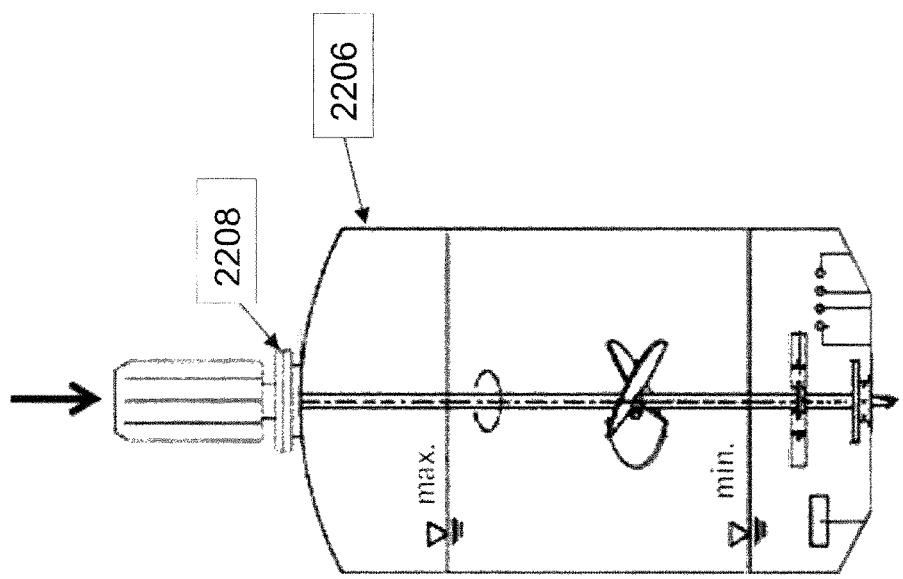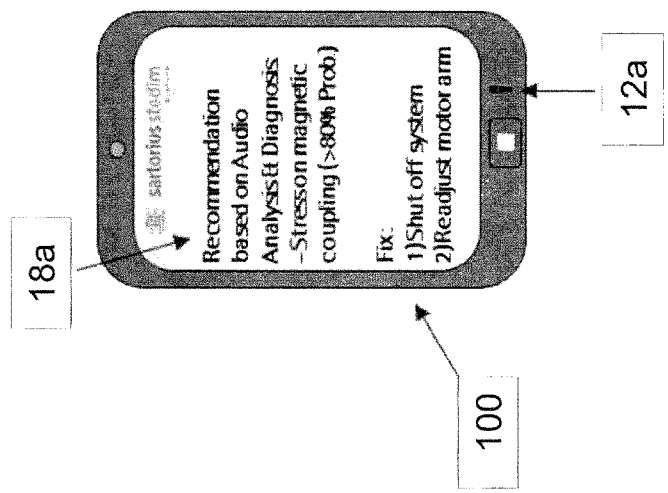
FIG. 8

AUDIO IDENTIFICATION DEVICE, AUDIO IDENTIFICATION METHOD AND AUDIO IDENTIFICATION SYSTEM

BACKGROUND

The application relates to an audio identification device for analyzing an audio signal to identify a state of a processing device included in a processing setup.

A processing setup may be, for example, a setup for performing a certain process on a product or a specimen. A processing setup may also be a setup for manufacturing a certain product. A processing setup may include at least one processing device appropriate for the purpose of the processing setup. Thus, different processing setups may include different processing devices. A single processing setup may also include more than one different processing devices.

Testing or diagnosis of a machine can be made by capturing and analyzing sound generated while operating the machine.

For example, U.S. Pat. No. 6,182,018 B1 discloses an apparatus that may be used to identify sources of squeaks, rattles, or unexpected noises in automotive vehicles. In U.S. Pat. No. 6,182,018 B1, impulsive sound components in a composite sound signal are separated using wavelet analysis and sorting of wavelet coefficient sets according to statistical parameters of each respective coefficient set. Each entire coefficient set is either included or excluded from each respective separated component based on the statistical parameter. Once the impulsive sound component is isolated, it is compared with reference sound information in order to classify the sound according to its potential causes.

Further, for example, DE 10 2008 057 458 A1 discloses a method for integrity testing of at least one filter element disposed within a filter housing by measuring sound generated by a test fluid as it flows through the filter element and comparing the measured sound with sound previously measured under identical conditions with the same type of filter element.

As stated above, a processing setup may include more than one processing devices. Further, different processing setups may include different processing devices. Different processing devices may generate different types of sound. Thus, in order to test or diagnose various processing devices using sound analysis, the amount of audio data referenced for the analysis may become huge.

SUMMARY

According to one aspect, an audio identification device is provided. The audio identification device comprises the following:

at least one sensing device configured to capture an audio signal present in a working space of a processing setup including at least one processing device; and a processor configured to:

receive information related to the at least one processing device;

retrieve audio data stored in a database using the received information related to the at least one processing device;

identify a state of the at least one processing device by analyzing the audio signal captured by the at least one sensing device based on the retrieved audio data; and output a response, the response being determined based on the identified state of the at least one processing device.

BRIEF DESCRIPTION OF THE DRAWINGS

Details of exemplary embodiments are set forth below with reference to the exemplary drawings. Other features will be apparent from the description, the drawings, and from the claims.

FIG. 4 shows an example of an implementation of an audio identification system.

FIG. 8 shows yet another example of an implementation of an audio identification system.

DETAILED DESCRIPTION OF EMBODIMENTS

In the following text, a detailed description of examples will be given with reference to the drawings. It should be understood that various modifications to the examples may be made. In particular, one or more elements of one example may be combined and used in other examples to form new examples.

Figure 1:
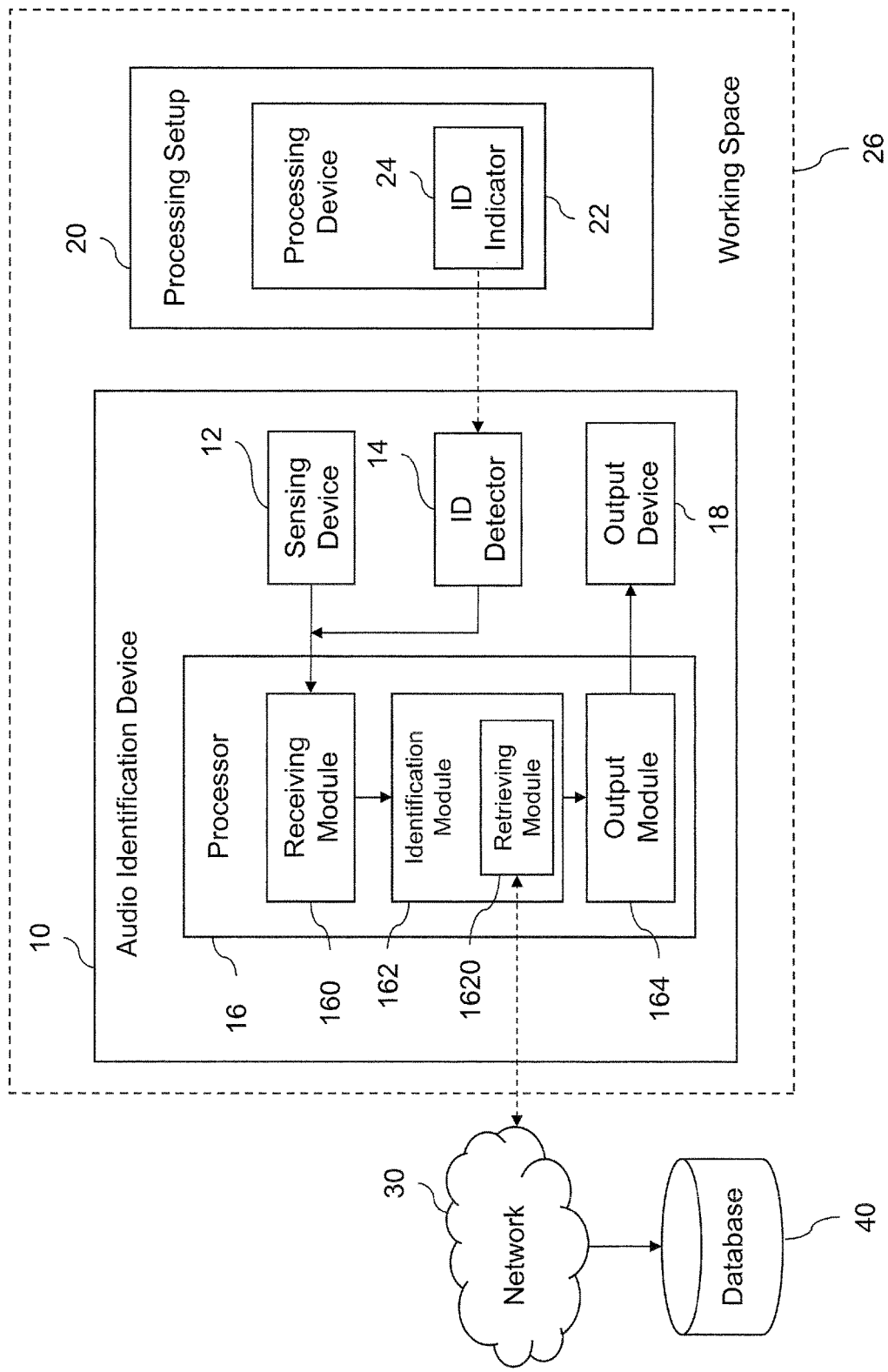
FIG. 1 shows an example of a functional block diagram of an audio identification system.

FIG. 1 shows an example of a functional block diagram of an audio identification system. The audio identification system shown may include an audio identification device 10 disposed in a working space 26 of a processing setup 20. The audio identification device 10 may be connected to a database 40 via a network 30. The network 30 may be a communication network such as a LAN (local area network), a WAN (wide area network) and the Internet. The network 30 may involve at least one of a wireless network and wired network.

The processing setup 20 may be a setup for performing a certain process on a product or specimen, for example. The processing setup 20 may also be a setup for manufacturing a certain product. The processing setup 20 may include at least one processing device 22 appropriate for the purpose of the processing setup 20. It should be noted that, although FIG. 1 shows only one processing device 22, the processing setup 20 may include more than one processing devices 22. The processing device 22 may be provided with an ID (identification) indicator 24 that indicates identification information of the processing device 22. The ID indicator 24 may be, but not limited to, a machine-readable code such as a barcode, QR code, datamatrix code, AR (augmented reality) marker, etc., character string suitable for OCR (optical character recognition), an RFID (radio frequency identifier) tag or an NFC (near field communication) tag.

The database 40 may store audio data of processing devices that may be used in various processing setups. The database 40 may store audio data of each processing device in association with the identification information of that processing device. The audio data of a processing device may include at least one of normal operating sounds of the processing device, sounds indicating mechanical issues of the processing device and sounds induced by the processing device. The sounds indicating mechanical issues may include, for example, sounds of scraping, grinding, rumbling, banging, etc. of the processing device. The sounds induced by the processing device may include, for example, sounds of alarm(s) provided on the processing device.

The database 40 may also store information indicating a possible state of a processing device, corresponding to the audio data of each type of the sounds as illustrated above. For example, the database 40 may store, in association with the audio data of normal operating sounds of the processing device, information indicating that the processing device is possibly in a normal state. Further, for example, the database 40 may store, in association with the audio data of sounds indicating mechanical issues of the processing device, information indicating the possible modes of failure the processing device is in. Similarly, for example, the database 40 may store, in association with the audio data of sounds induced by the processing device, information indicating the possible modes of failure the processing device is in.

The audio data stored in the database 40 may be recorded and collected while processing devices are being tested before shipment. Alternatively or in addition, the audio data stored in the database 40 may be recorded and collected during actual operations of the processing devices in processing setups.

The audio identification device 10 may include a sensing device 12, an ID detector 14, a processor 16 and an output device 18. The sensing device 12 may be configured to capture an audio signal present in the working space 26 of the processing setup 20. The sensing device 12 may be a microphone, for example. Although FIG. 1 shows only one sensing device 12, the audio identification device 10 may include more than one sensing devices 12. For instance, the audio identification device 10 may include an array of sensing devices 12. The array of sensing devices 12 may be implemented by a microphone array.

The ID detector 14 may be configured to detect the identification information indicated by the ID indicator 24 provided on the processing device 22. The ID detector 14 may employ a technology corresponding to the one employed by the ID indicator 24. For example, in case the ID indicator 24 is a machine-readable code such as a barcode, QR code, datamatrix code, AR marker, etc., the ID detector 14 would be a reader device that includes an imaging device for scanning the machine-readable code and that is capable of decoding the scanned machine-readable code. In case the ID indicator 24 is a character string suitable for OCR, the ID detector 14 would be an OCR reader. Alternatively, in case the ID indicator 24 is an RFID tag or an NFC tag, the ID detector 14 would be an RFID reader or an NFC reader.

In yet another example of the ID detector 14, the ID detector 14 may include an imaging device such as a camera configured to capture an image of the processing device 22. In this example, the ID detector 14 may be configured to detect the identification information of the processing device 22 performing a visual method of identification on the captured image. The visual method of identification may include, but not limited to, similarity search of the image, CAD model tracking, edge based tracking and 3D scanning of the processing device or a method based on other visual landmarks of the processing device. In this example, the processing device 24 does not need to be provided with the ID indicator 24.

FIGS. 2A to 2D shows examples of how identification information of a processing device is obtained. In the examples shown in FIGS. 2A to 2D, the audio identification device 10 is implemented on a mobile device 100 and the processing device 22 is a single-use bioreactor 220 such as the BIOSTAT CultiBag STR commercialized by Sartorius Stedim Biotech GmbH. A "bioreactor" may be understood as a device or system that supports a biologically active environment. For example, a "bioreactor" may be a device or system meant to grow cells or tissues in the context of cell culture.

Figure 2A:
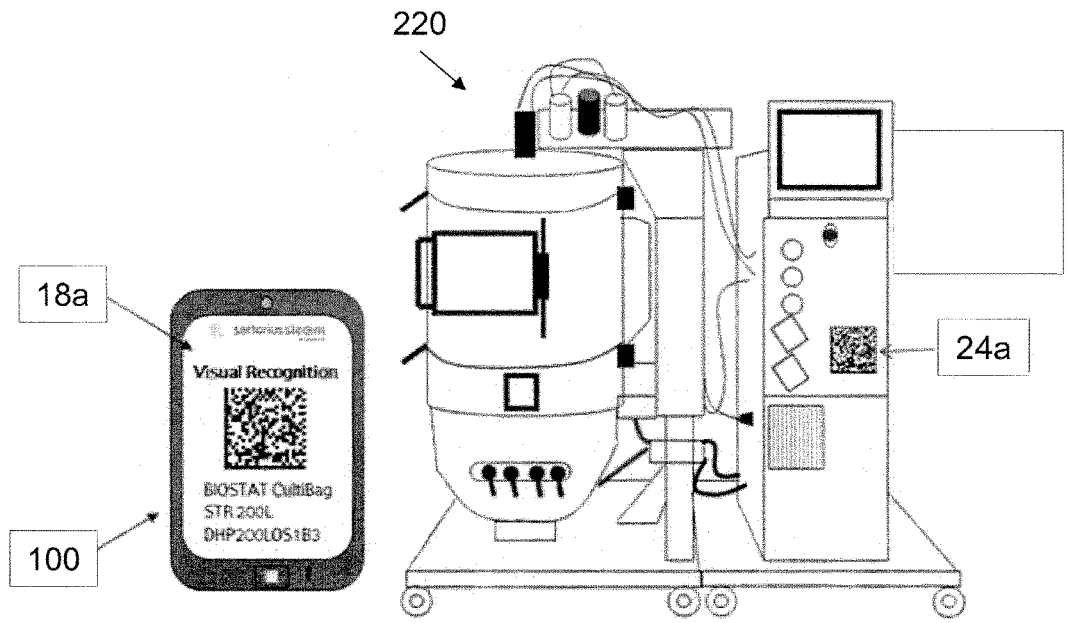
FIGS. 2A to 2D show examples of how identification information of a processing device is obtained.
Figure 2B:
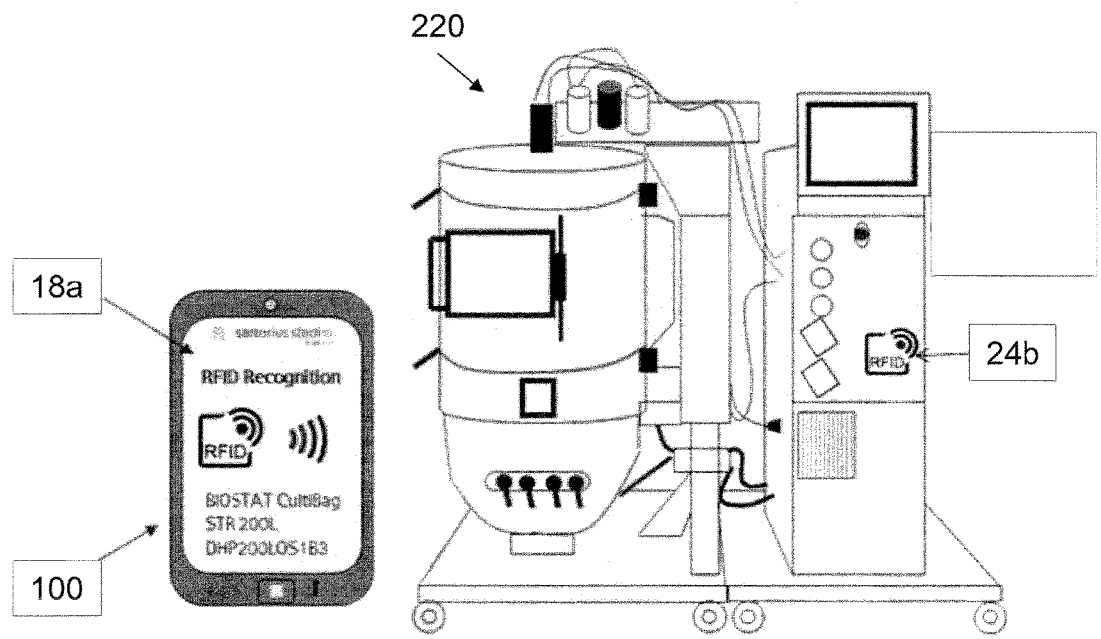
Figure 2C:
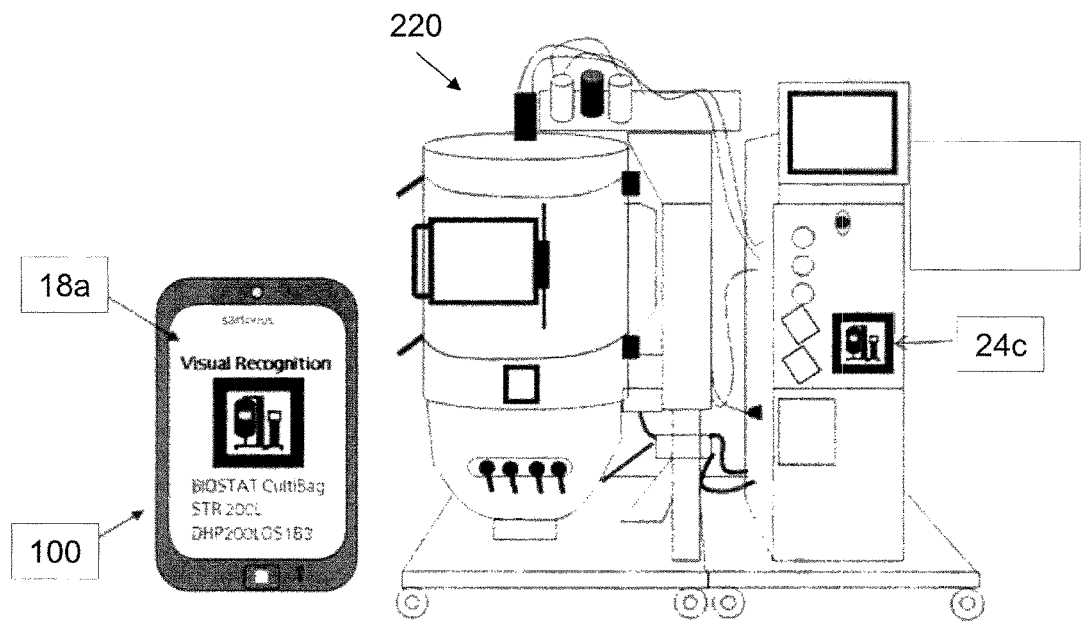
Figure 2D:
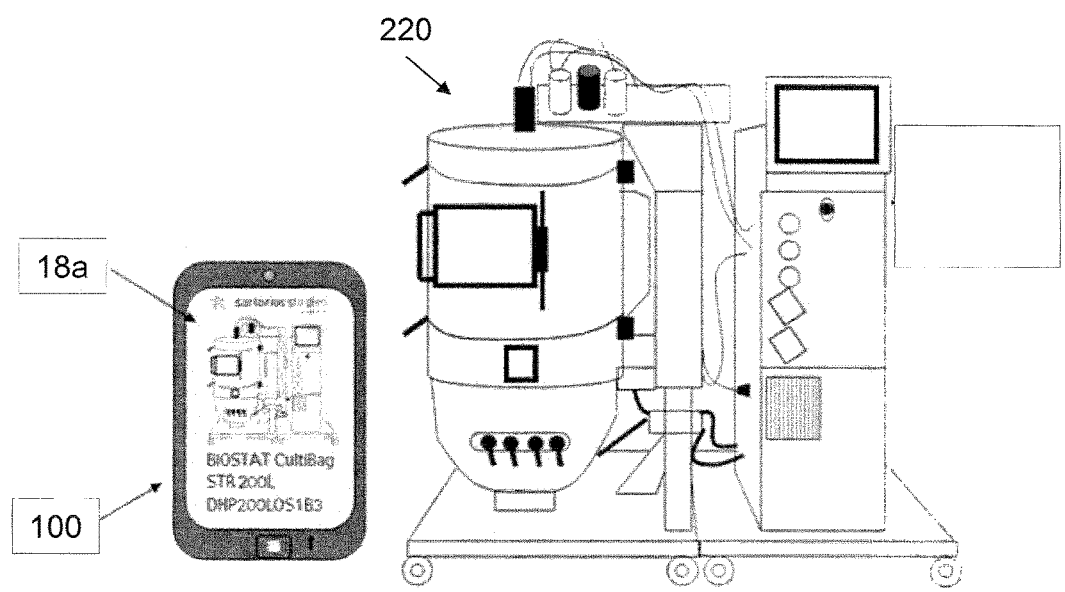

In FIGS. 2A, 2B and 2C, the identification information of the single-use bioreactor 220 is indicated by the ID indicator 24a, 24b and 24c as a barcode, RFID tag and an AR marker, respectively. The display 18a of the mobile device 100 shown in FIGS. 2A, 2B, and 2C show the obtained identification information and the respective means of detection. In FIG. 2D, the identification information of the single-use bioreactor 220 is obtained from an image of the single-use bioreactor 220 captured by a camera, e.g. on the mobile device 100. The display of the mobile device 100 shown in FIG. 2D show the obtained identification information and the captured image of the single-use bioreactor 220.

Referring again to FIG. 1, the processor 16 may be configured to perform various processing to identify a state of the processing device 22. The processor 16 may include a receiving module 160, an identification module 162 and an output module 164. The receiving module 160 may be configured to receive the audio signal captured by the sensing device 12 and the identification information of the processing device 22 detected by the ID detector 14.

The identification module 162 may be configured to identify a state of the processing device 22 using the audio signal and the identification information received at the receiving module 160. The identification module 162 may include a retrieving module 1620 configured to retrieve audio data stored in the database 40 via the network 30, using the identification information of the processing device 22. For example, the retrieving module 1620 may be configured to retrieve audio data stored in the database 40 in association with the identification information of the processing device 22. The use of the identification information of the processing device 22 can limit the audio data subject to search exclusive to that processing device 22, which leads to faster search with enhanced reliability. The identification module 162 may be configured to identify the state of the processing device 22 by analyzing the audio signal captured by the sensing device 12 based on the audio data retrieved by the retrieving module 1620.

For example, the identification module 162 may perform a similarity search on the retrieved audio data, comparing the audio signal captured by the sensing device 12 with the retrieved audio data. By identifying audio data similar to the audio signal captured by the sensing device 12, the identification module 162 may identify the state of the processing device 22 using the information indicating the possible state of the processing device 22 stored in the database 40 in association with the identified audio data. For example, the identification module 162 may identify that the processing device 22 in a normal state or in a particular mode of failure. The identification module 162 may also obtain a percentage of confidence for the identified state of the processing device 22 from the results of the similarity search.

Further, for example, the identification module 162 may determine whether or not the captured audio signal contains an audio signal of the processing device 22 operating within the standard parameters of audio signals from the processing device 22. The standard parameters may be stored in the database 40 in association with the identification information of the processing device 22.

The identification module 162 may create an audio data file from the audio signal captured by the sensing device 12 and upload the audio data file onto the database 40, together with the identified state of the processing device 22. When a percentage of confidence for the identified state is obtained, the identification module 162 may upload also the percentage of confidence onto the database 40. The upload of the audio data file can increase the robustness of the future similarity searches. Further, when the database 40 is shared among audio identification devices placed in different processing setups, the upload of the audio data file can also assist the identification of the state of the processing device in another processing setup.

When analyzing the audio signal captured by the sensing device 12, the identification module 162 may also exclude or reduce ambient noise pollution, e.g., talking, footsteps, lights humming, echoes (in case the audio identification device 10 is in a confined space) or the operation of other equipment(s). This may be made by using known noise cancellation techniques.

The output module 164 is configured to output a response determined based on the identified state of the processing device 22. For example, the response may include indication of the identified state. The response may also include one or more required actions by an operator. The required actions may include at least one of: one or more operations to correct the issue, shutting down the processing device 22 and contacting technical support or service. The response to be output may be predefined in correspondence with one or more possible states of the processing device 22. The information indicating which response to output for which identified state may be stored in a storage device (not shown) within the audio identification device 10. Alternatively or in addition, such information may be stored in the database 40. Referring to such information in the storage device (not shown) and/or the database 40, the output module 164 may determine the response based on the identified state of the processing device 22. The output module 164 may output the determined response via the output device 18 and/or send an output signal to an output device external to the audio identification device 10.

The output device 18 may output the response determined by the output module 164. The output device 18 may include, but not limited to, at least one of a display device such as liquid crystal display, an audio output device such as a speaker, a haptic output device and an Augmented Reality display device. The response may be an output by the output device 18 in a form of audio or an image, or both.

The output device 18 may also output the audio signal captured by the sensing device 12. For example, as stated above, the identification module 162 may create an audio data file from the audio signal captured by the sensing device 12. The audio data file may be stored in the storage device (not shown) of the audio identification device 10 and may be output as audio or visual representation, or as both. The operator and/or a personnel from the technical support or service can listen to the captured audio signal when the audio data file is output as audio. The visual representation of the audio data file may provide waveforms of the captured audio signal.

It should be noted, although the exemplary audio identification device 10 shown in FIG. 1 includes the output device 18, that the audio identification device 10 do not need to include the output device 18 in another exemplary implementation. That is, the output device 18 may be provided external to the audio identification device 10.

Figure 3:
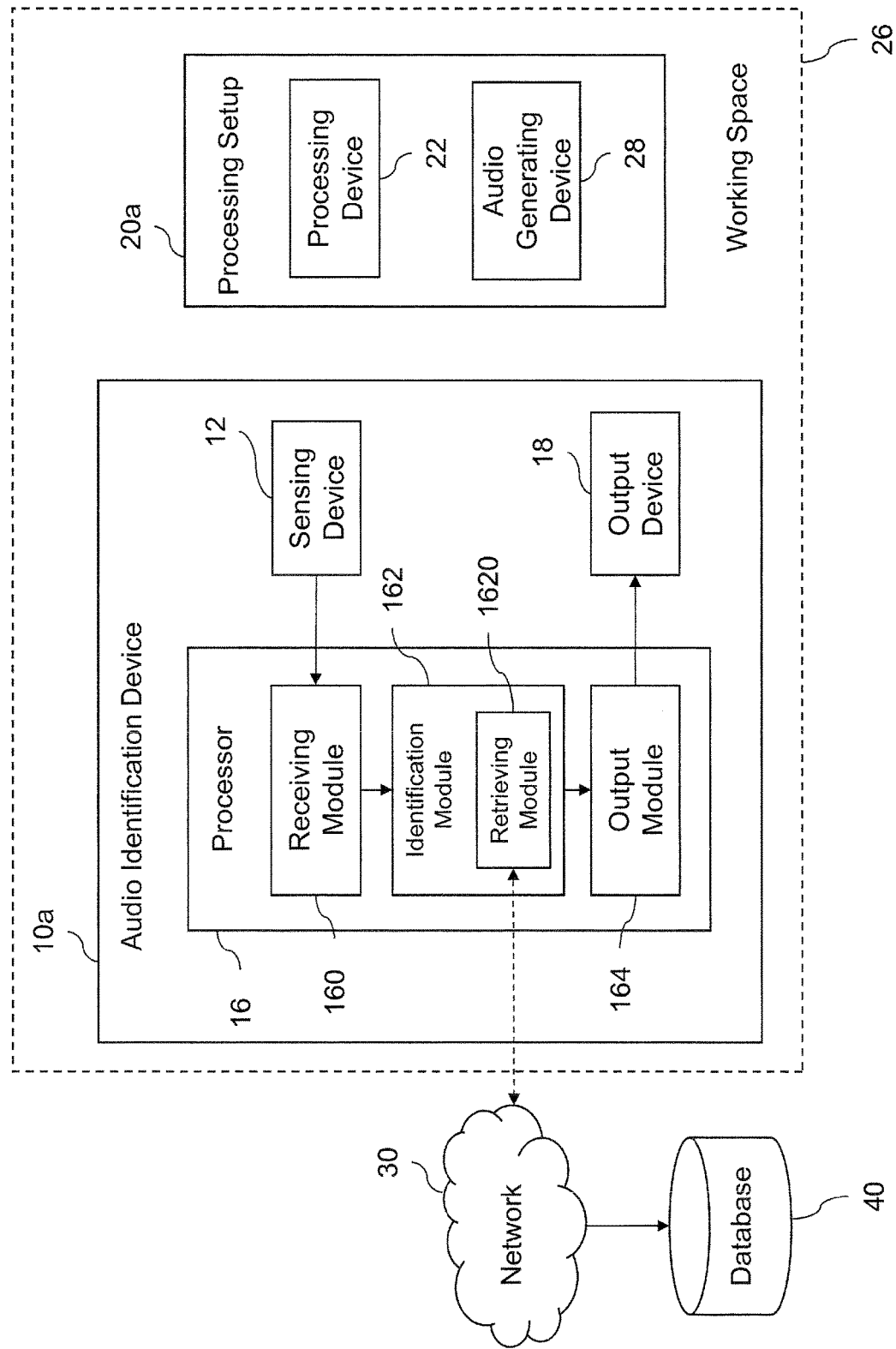
FIG. 3 shows another example of a functional block diagram of the audio identification system.

FIG. 3 shows another example of a functional block diagram of the audio identification system. In FIG. 3, elements identical to those shown in FIG. 1 are indicated by the same reference signs and detailed explanations thereof will not be provided. The audio identification device 10*a* shown in FIG. 3 does not include the ID detector 14 as shown in FIG. 1. The processing setup 20*a* shown in FIG. 3 does not include the ID indicator 12 provided on the processing device 22 as shown in FIG. 1. Instead, the processing setup 20*a* shown in FIG. 3 includes an audio generating device 28.

The audio generating device 28 may be configured to output an audio signature indicating the identification information of the processing device 22. The audio signature may be understood as an audio signal that includes identification information. The audio signature may be an embedded audio signature or an ultrasound or inaudible audio signature. The sensing device 12 of the audio identification device 10*a* may capture the audio signature as one of audio signals present in the working space 26. The processor 16 of the audio identification device 10*a* may be further configured to receive the audio signature via the sensing device 12 and determine the identification information of the processing device 22 from the audio signature.

In one example, the audio generating device 28 may be a resonator configured to emit a baseline harmonic sound. For example, the resonator may emit a baseline sound within 4 to 20 kHz for the audible range and 20 kHz to 1 MHz for ultrasonic frequencies. The processor 16 of the audio identification device 10*a* may be configured to determine the identification information of the processing device from the baseline harmonic sound. FIG. 4 shows an exemplary implementation of an audio identification system, when the audio generating device 28 shown in FIG. 3 is a resonator. In FIG. 4, the audio identification device 10*a* is implemented by a mobile device and the processing setup 20*a* includes a magnetic mixer 222 and a Palletank® single-use mixing vessel 224 connected to each other, as processing devices 22. The Palletank® single-use mixing vessel 224 comprises a resonator 2240 that creates a baseline harmonic sound BS.

The baseline harmonic sound BS resonates through the processing devices 222, 224. Further, in the example shown in FIG. 4, the magnetic mixer 222 is emitting a grinding sound GS which is coming from the mixing shaft. A microphone 12a of the mobile device 100 (as an example of the sensing device 12 of the audio identification device 10a) captures the baseline harmonic sound BS and the grinding sound GS. The processor 16 implemented in the mobile device 100 may determine that the baseline harmonic sound BS as coming from the Palletank® single-use mixing vessel 224. The grinding sound GS may be analyzed by referring to the database 40 as in the examples described above and the state of the Palletank® single-use mixing vessel 224 can be determined. The display 18a of the mobile device shown in FIG. 4 display visual representations BS1, GS1 of the baseline harmonic sound BS and the grinding sound GS.

Figure 5:
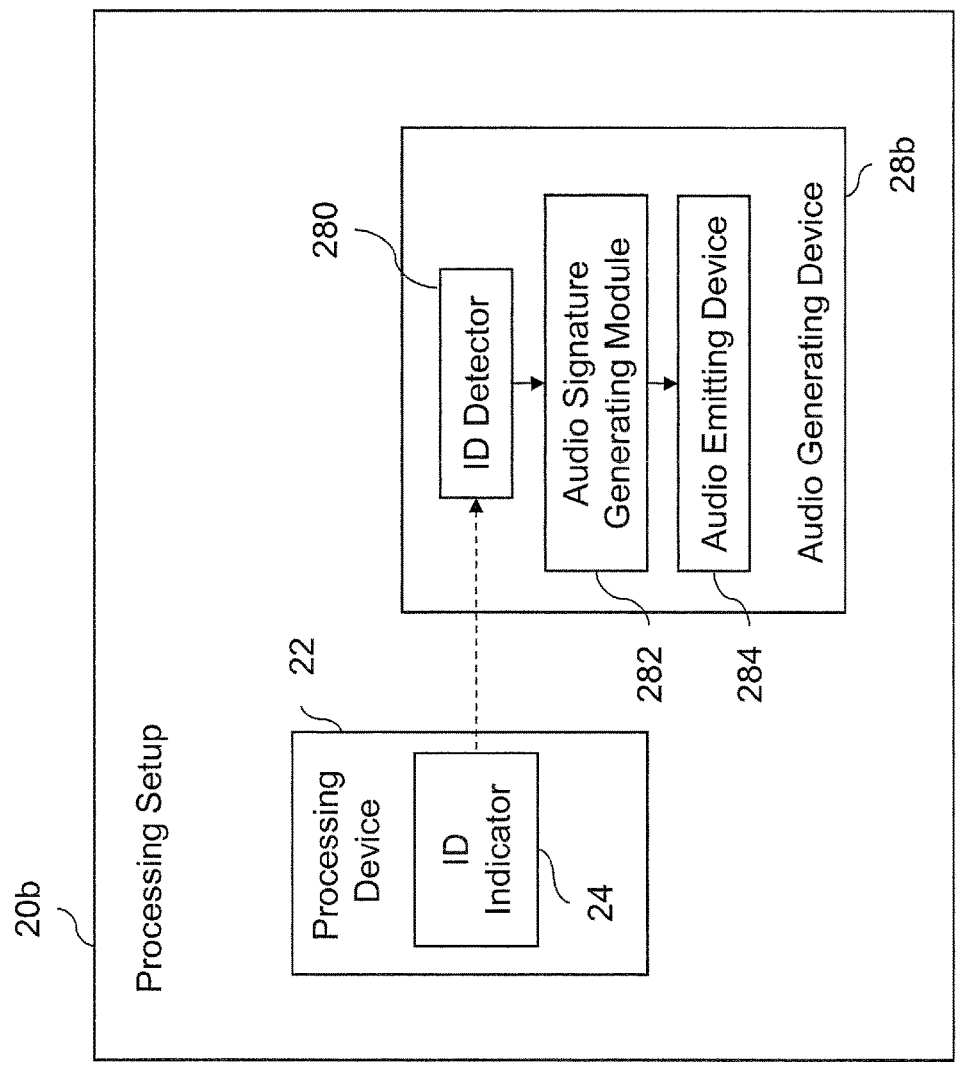
FIG. 5 shows an example of a functional block diagram of a processing setup.

FIG. 5 shows an example of a functional block diagram of a processing setup including yet another example of the audio generating device 28 shown in FIG. 3. In the example shown in FIG. 5, the processing device 22 is provided with an ID indicator 24. The ID indicator 24 shown in FIG. 5 may be the same as the ID indicator 24 described above in reference to FIGS. 1 and 2A to 2C. Further, in the example shown in FIG. 5, the audio generating device 28b includes an ID detector 280, an audio signature generating module 282 and an audio emitting device 284. The ID detector 280 may be the same as the ID detector 14 described above in reference to FIGS. 1 and 2D. That is, the ID detector 280 may detect identification information of the processing device 22 by reading machine-readable code, character string for OCR, RFID tag or NFC tag or by capturing an image of the processing device 22. The audio signature generating module 282 generates an audio signature including the identification information of the processing device 22 detected by the ID detector 280. The audio emitting device 284 may emit the audio signature generated by the audio signature generating module 282. The processor 16 of the audio identification device 10a can then determine the identification information of the processing device 22 from the audio signature received via the sensing device 12 (see FIG. 3).

In yet another example with respect to the exemplary configuration shown in FIG. 3, the audio signature may be an ambient audio signature of the processing device 22. For example, the ambient sound generated by the processing device 22 during operation, such as the sound of a rotating impeller on a bioreactor or the compressed air exhaust from an integrity testing device (not shown), may be used as the audio signature for identifying the processing device 22. In this example, the processing setup 20a does not need to include the audio generating device 28.

The audio generating device 28 and 28b described above with reference to FIGS. 3 to 5 may be either integrated into the processing device 22 or removably attached to the processing device 22.

The audio identification device 10 and 10a as described above may be implemented on a mobile device (as in the examples shown in FIGS. 2A to 2D and FIG. 4) or on a wearable device. Alternatively, the audio identification device 10 and 10a may be implemented on a computer within the processing device 22. In yet another example, the audio identification device 10 and 10a may be implemented on a computer external to the processing device 22. The external computer implementing the audio identification device 10 or 10a may be removably attached to the processing device or placed at a fixed position within the working space 26 without having direct contact with the processing device. Further, for example, the external computer implementing the audio identification device 10 or 10a may be a part of a monitoring computer system provided within the working space 26.

Exemplary processing performed by the audio identification device 10 will now be described referring to FIG. 6. The exemplary processing described below may be performed by any of the examples of the audio identification device 10 and 10a as described above. Further, in the following, statements referring to the audio identification device 10 may also apply to the audio identification device 10a, unless otherwise noted.

Figure 6:
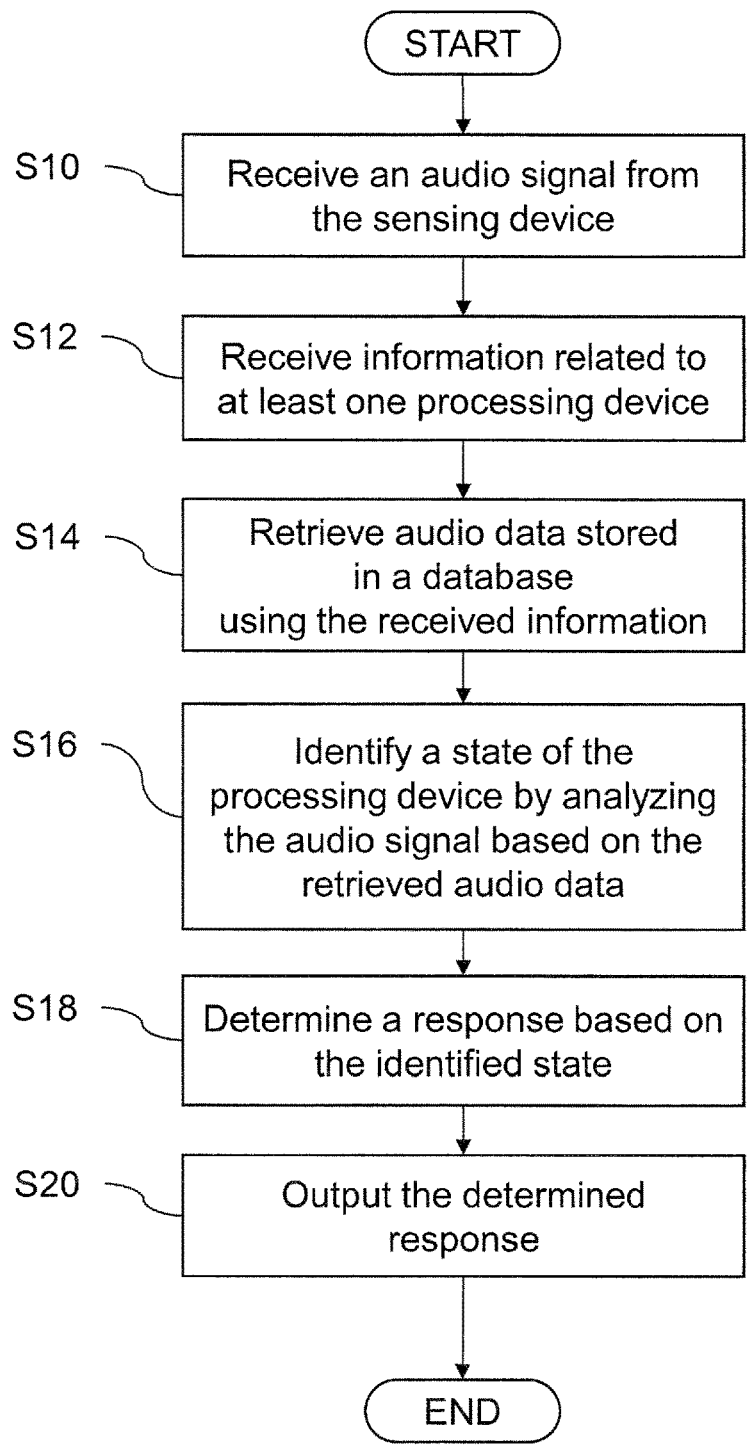
FIG. 6 shows a flowchart of exemplary processing performed by a processor of an audio identification device.

The exemplary processing shown in FIG. 6 may be performed by the processor 16 of the audio identification device 10. The processor 16 may start the exemplary processing shown in FIG. 6 in response to an input by an operator through an input device (not shown) of the audio identification device 10, instructing the audio identification device 10 to start the processing, for example. Alternatively, the processor 16 may start the exemplary processing shown in FIG. 6 at a time previously specified by the operator, or in a predetermined time interval.

The processing starts from step S10. In step S10, the receiving module 160 of the processor 16 receives an audio signal from the sensing device 12. The audio signal has been captured by the sensing device 12 in the working space 26 of the processing setup 20. After step S10, the processing proceeds to step S12.

In step S12, the receiving module 160 of the processor 16 receives information related to at least one processing device 22 of the processing setup 20. For example, the receiving module 160 may receive the identification information of the processing device 22 detected by the ID detector 14 as described above with reference to FIGS. 1 and 2A to 2C. Alternatively, the receiving module 160 may receive the audio signature including the identification information of the processing device 22 from the sensing device 12 as described above with reference to FIGS. 3 to 5. After step S12, the processing proceeds to step S14.

In step S14, the retrieving module 1620 in the identification module 162 of the processor 16 retrieves audio data stored in the database 40 using the information received in step S12. For example, the retrieving module 1620 may retrieve the audio data stored in the database 40 in association with the identification information of the processing device 22. In case the receiving module 160 has received the audio signature including the identification information of the processing device 22 in step S12, the retrieving module 1620 may determine the identification information from the audio signature before retrieval of the audio data. After step S14, the processing proceeds to step S16.

In step S16, the identification module 162 of the processor 16 identifies a state of the processing device by analyzing the audio signal based on the audio data retrieved in step S14. For example, the identification module 162 may perform a similarity search on the retrieved audio data. The identification module 162 may then identify the state of the processing device 22 using the information indicating the possible state of the processing device 22 stored in the database 40 in association with the audio data that is considered to be the most similar to, in other words the best match with, the audio signal. The identified state may be, for example, a normal state or a particular mode of failure of the processing machine. Noise cancellation for the audio signal in order to exclude ambient noise pollution may also be performed in step S16. The identification module 162 may also obtain a percentage of confidence for the identified state of the processing device 22 from the results of the similarity search in step S16. After step S16, the processing proceeds to step S18.

In step S18, the output module 164 determines a response based on the state identified in step S16. For example, the output module 164 may determine that the response includes indication of the identified state of the processing device 22. Alternatively or in addition, the output module 164 may determine that the response includes one or more required actions by an operator. As described above referring to FIG. 1, the output module 164 may determine the response by referring to information indicating a predefined response for each possible state of the processing device 22. After step S18, the processing proceeds to step S20.

In step S20, the output module 164 outputs the response determined in step S18. The output module 164 may output the response via the output device 18. The response may be output in a form of audio or an image, or both. The exemplary processing shown in FIG. 6 ends after step S20.

Further examples of implementations of the above-described audio identification system will now be described, referring to FIGS. 7 to 13. The following examples shown in FIGS. 7 to 13 do not always refer to obtaining the identification information of the processing device 22, it should be understood that the identification information of the processing device 22 may be obtained also in these examples in any of the manner described above with reference to FIGS. 1 to 5.

Figure 7:
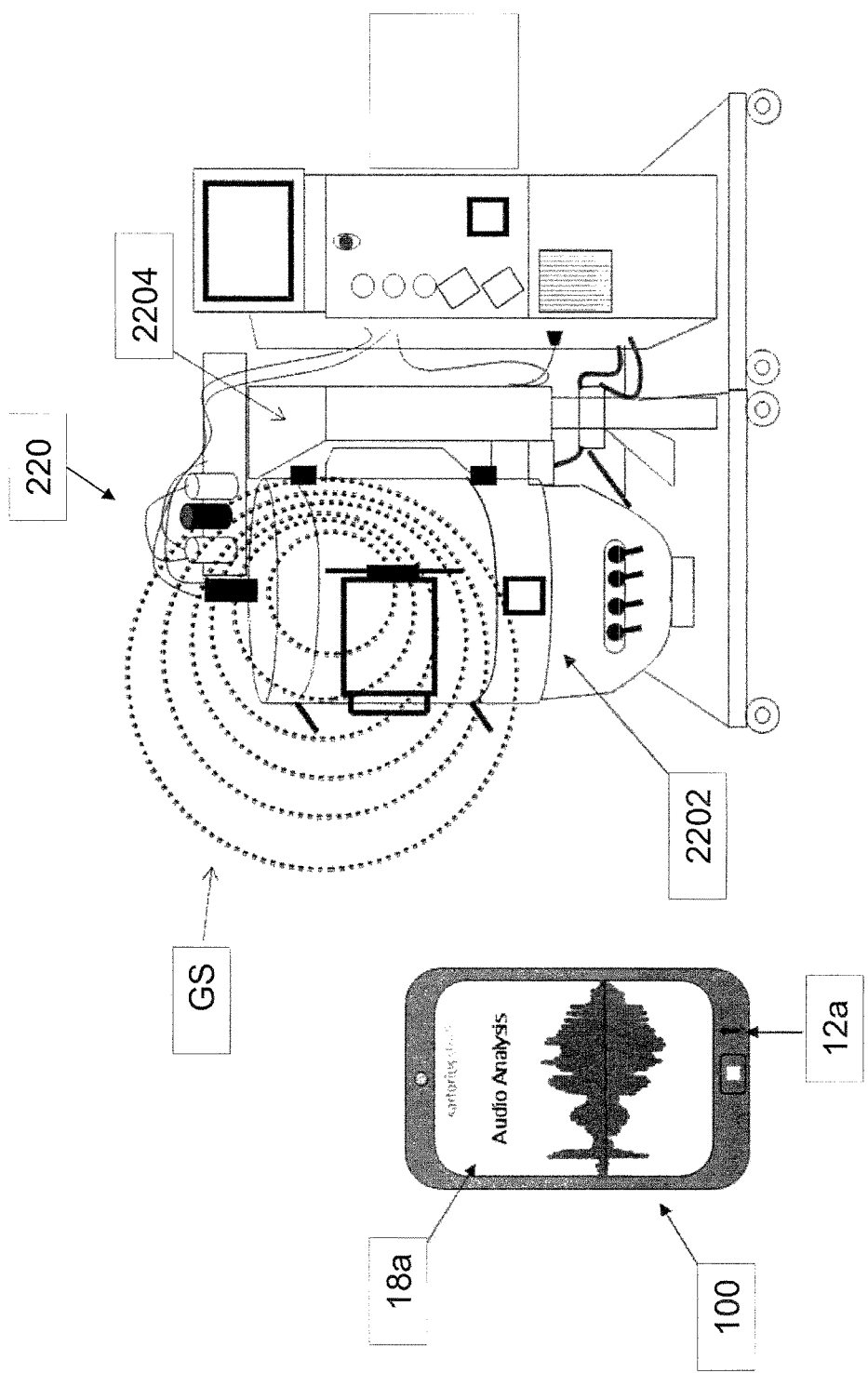
FIG. 7 shows another example of an implementation of an audio identification system.

In the exemplary implementation shown in FIG. 7, the audio identification device 10 is implemented on a mobile device 100 and the processing device 22 is a single-use bioreactor 220. The single-use bioreactor 220 comprises a single-use bag assembly 2202 and a motor arm 2204. In this example, the single-use bioreactor 220 is emitting a grinding sound GS coming from the upper section of the installed single-use bag assembly 2202. A microphone 12a of the mobile device 100 (as an example of the sensing device 12 of the audio identification device 10a) captures the grinding sound GS. The captured grinding sound GS is output as visual representation on the display 18a of the mobile device 100. The captured grinding sound GS may be analyzed using the audio data stored in the database 40 in association with the identification information of the single-use bioreactor 220 and the state of the single-use bioreactor 220 is identified, as described above. Instructions on how to correct the issue in the identified state may be an output as a response on the display 18a of the mobile device 100.

FIG. 8 shows an exemplary front view of the single-use bag assembly 2202 comprised in the single-use bioreactor 220 shown in FIG. 7. A shaft is coupled to the single-use bag 2206 inside of the single-use bioreactor unit through magnetic coupling 2208. In the exemplary implementation shown in FIG. 8, the audio identification device 10 is implemented on a mobile device 100. In this example, the grinding sound may be identified by the audio identification device 10 as being caused by the bearings on the shaft, by performing the exemplary processing as described above with reference to FIG. 6. Further, in this example, the response displayed on the display 18a of the mobile device 100 is a visual recommendation to the operator including a diagnosis of the issue with a percentage of confidence based on the analysis of the captured audio signal. The response indicates the operator to stop the single-use bioreactor 220 and re-adjust the motor arm 2204 on the single-use bioreactor 220 (see FIG. 7), which is compressing the internal shaft of the mixer leading to the grinding of the bearings on the magnetic coupling 2208 of the shaft inside the single-use bag 2206. The response may also be provided through audio or haptic effects such as vibrations of the mobile device.

Figure 9:
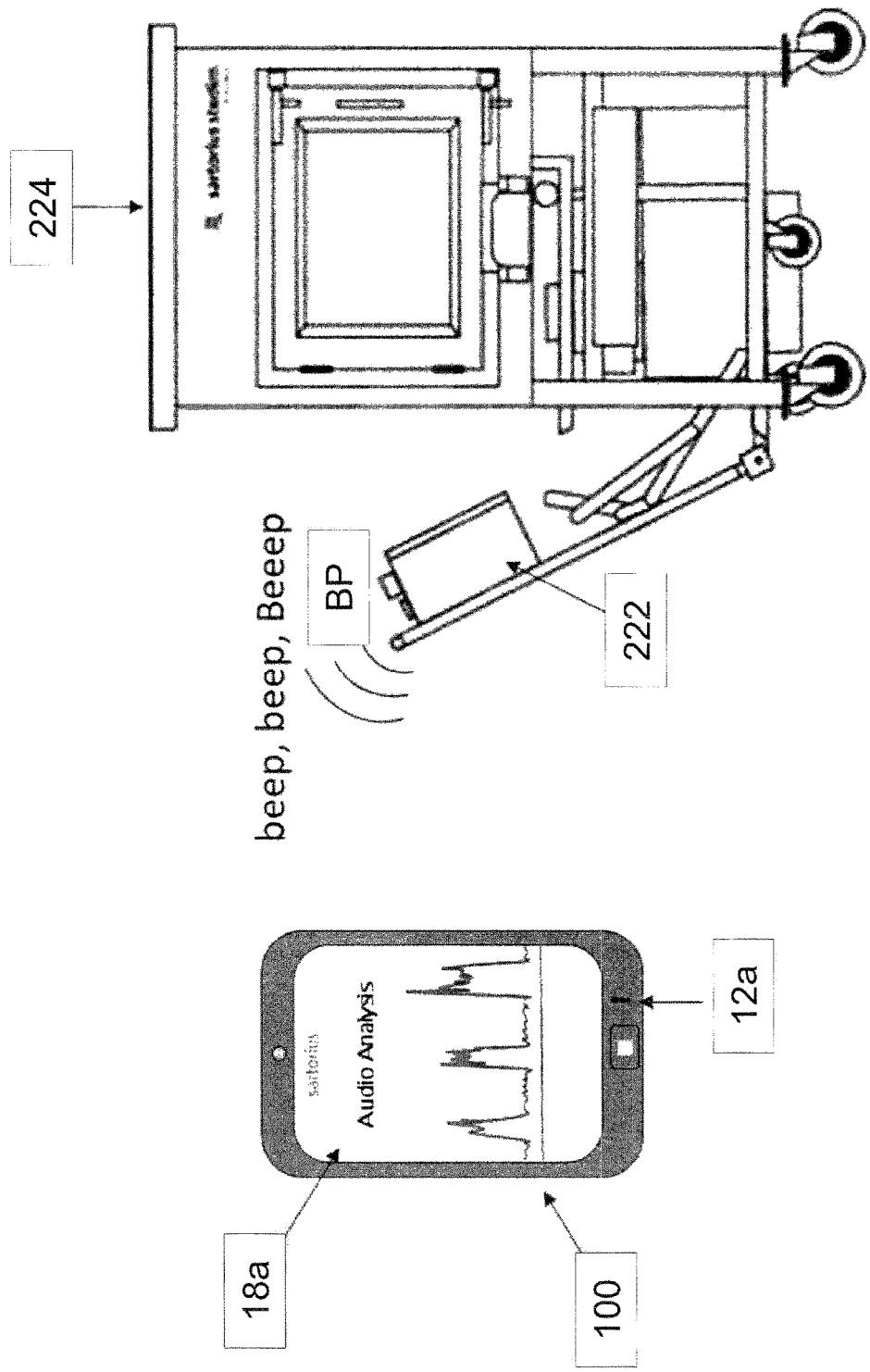
FIG. 9 shows yet another example of an implementation of an audio identification system.

In the exemplary implementation shown in FIG. 9, sounds produced by the processing device 22 is analyzed for identifying the state of the processing device 22. In FIG. 9, the audio identification device 10 is implemented on a mobile device 100 and the processing setup includes a magnetic mixer 222 and a Palletank® single-use mixing vessel 224 connected to each other, as processing devices 22. In this example, the magnetic mixer 222 has an error message during operation and communicates the error message with a series of beeps BP. In this example, the series of beeps BP signal an error code representing a power disruption that has interrupted the programmed mixing run. The series of beeps BP may be captured by a microphone 12a of the mobile device 100 and output on the display 18a in visual representation. The captured sound may be analyzed according to, for example, the exemplary processing shown in FIG. 6. As a result, the error code representing a power disruption that has interrupted the programmed mixing run can be identified and shown on the display 18a. The response shown on the display 18a may include instructions to the operator how to correct the issue.

Figure 10:
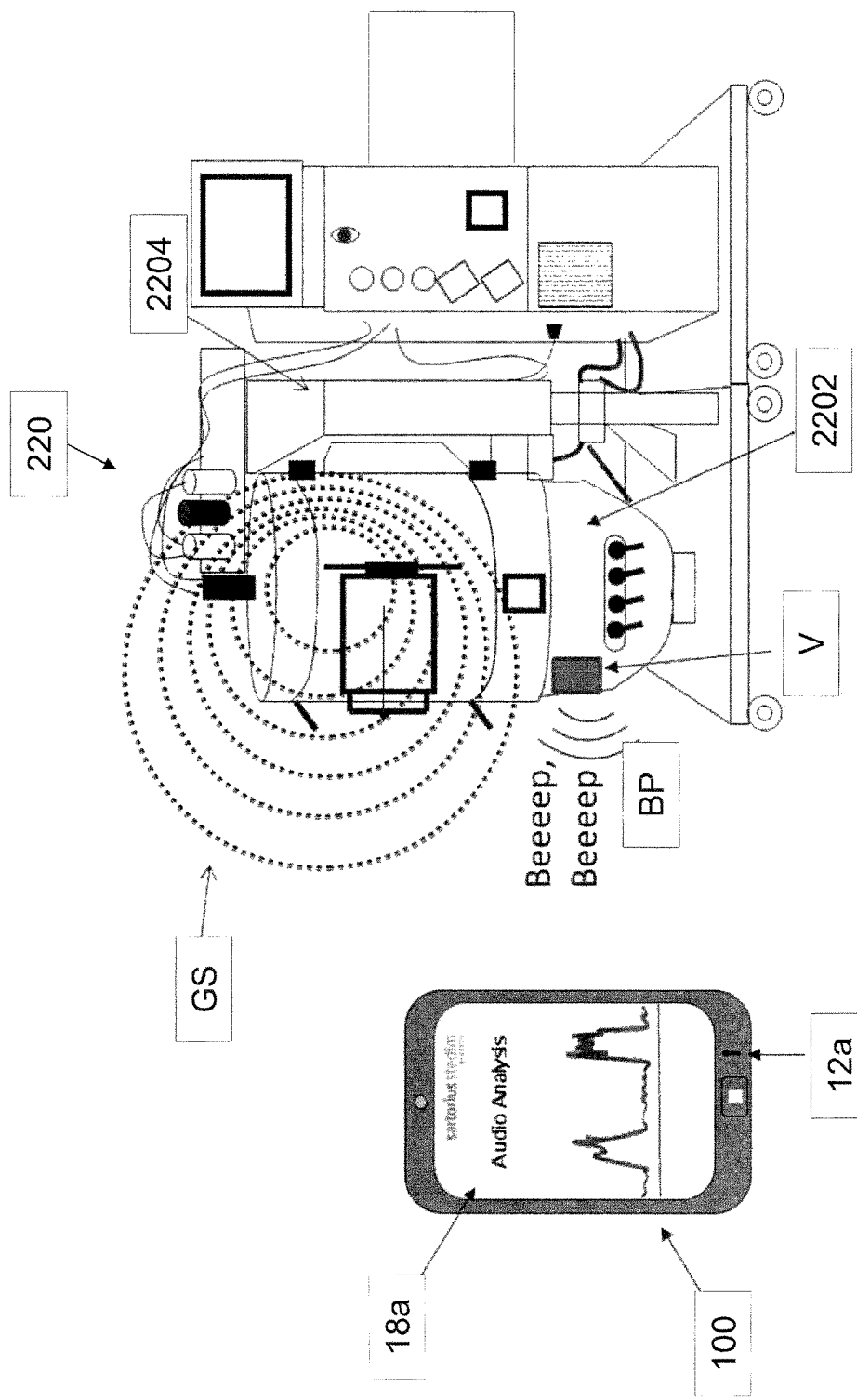
FIG. 10 shows yet another example of an implementation of an audio identification system.

In the exemplary implementation shown in FIG. 10, sounds produced by a vibration sensor attached to the processing device 22 are captured and analyzed for identifying the state of the processing device 22. In FIG. 10, the audio identification device 10 is implemented on a mobile device 100 and the processing device 22 is a single-use bioreactor 220 comprising a single-use bag assembly 2202 and a motor arm 2204. In this example, a vibration sensor V may be integrated into or removably attached to the single-use bioreactor 220. Further in this example, the single-use bioreactor 220 is emitting a grinding sound GS coming from the upper section of the installed single-use bag assembly 2202. The vibration sensor V can detect the vibration, frequency and pattern of the grinding occurring on the installed single-use bag assembly 2202. The result of this detection by the vibration sensor V may be analyzed by an onboard computer of the single-use bioreactor 220 and produce a sequence of beeps BP or tones signaling an error code. The sequence of beeps BP or tones may be captured by the microphone 12a of the mobile device 100 (as an example of the sensing device 12 of the audio identification device 10a) and output on the display 18a in visual representation. The captured sound may be analyzed according to the exemplary processing shown in FIG. 6. The response output on the display 18a of the mobile device 100 may include instructions on how to correct the issue. For example, the response may include recommending the operator to stop the single-use bioreactor 220 and re-adjust the motor arm 2204 on the single-use bioreactor 220.

Figure 11:
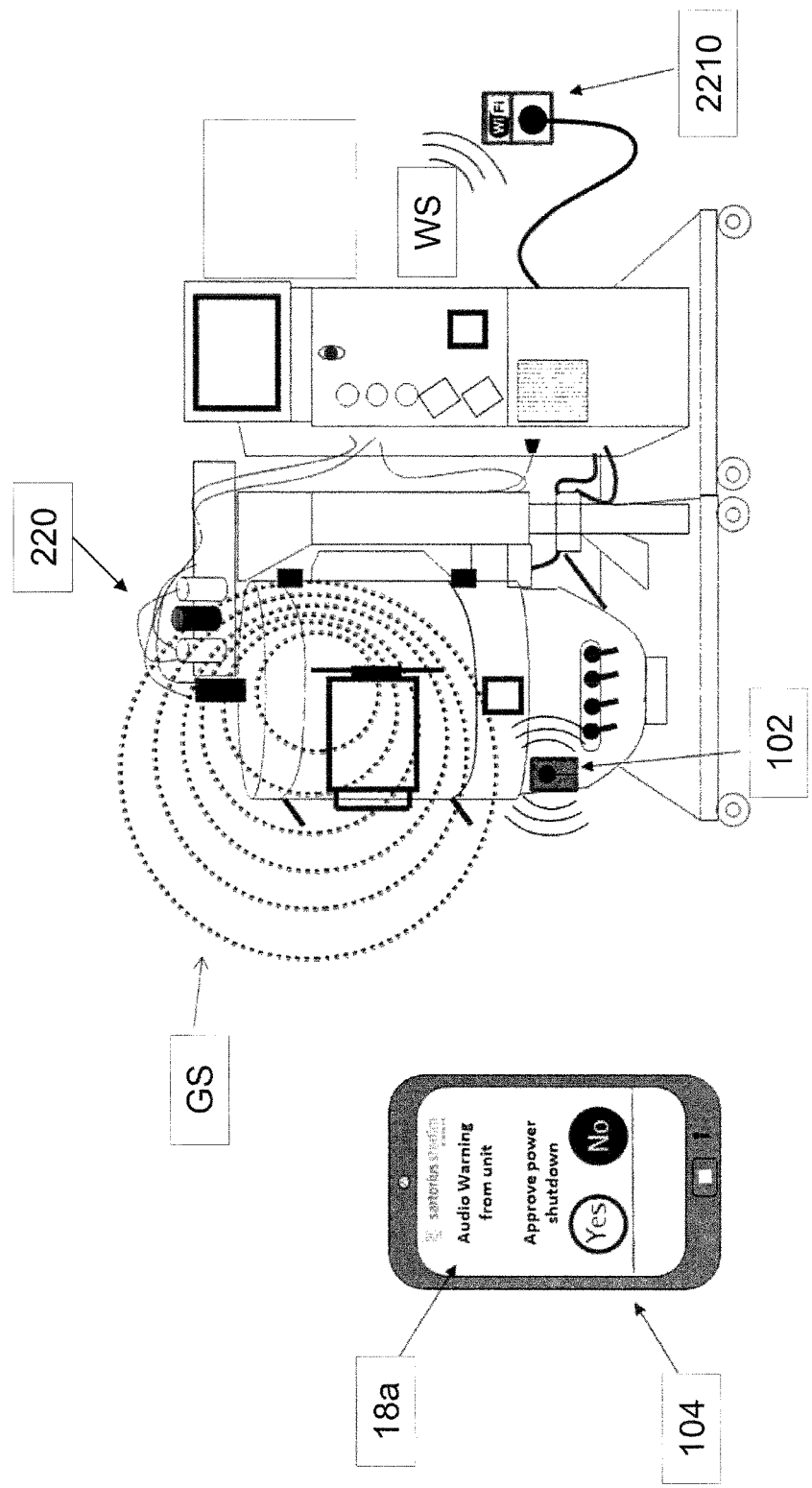
FIG. 11 shows yet another example of an implementation of an audio identification system.

FIG. 11 shows yet another exemplary implementation in which the audio identification device 10 can remotely cut power to the processing device 22. In this example, the audio identification device 10, 10a may be implemented on a computing device 102 integrated into or removably attached to the processing device 22. In the example of FIG. 11, the processing device 22 is a single-use bioreactor 220. The single-use bioreactor 220 may be connected to a power source via a wireless electric switch 2210. In this example, the single-use bioreactor 220 is emitting a grinding sound GS coming from the upper section of the installed single-use bag assembly. The grinding sound GS may be captured and analyzed by the computing device 102 implementing the audio identification device 10, 10a according to the exemplary processing shown in FIG. 6, for example. If the identified state of the single-use bioreactor 220 is one of the states previously specified as states in which shutdown of the single-use bioreactor 220 is advisable, the computing device 102 may, for example, send a wireless alert to a communication device 104 (e.g., a mobile phone) of an operator. The computing device 102 may also send (at least a portion of) the captured sound to the communication device 104 so that the operator can listen to the captured sound. The alert sent to the communication device 104 may include information requiring the operator to provide an input whether or not to allow shutdown of the processing device. The operator can give the input on the communication device 104 and the communication device 104 may send the input back to the computing device 102. If the input by the operator indicates the operator's approval, the computing device 102 outputs a wireless signal WS to the wireless electric switch 2210 and disconnects the power source from the single-use bioreactor 220 using the wireless electric switch 2210. In an exemplary variation of this example shown in FIG. 11, the computing device 102 may shut down the single-use bioreactor 220 by sending the wireless signal WS to the wireless electric switch 2210 without sending an alert to the communication device 104 of the operator.

In the exemplary implementation shown in FIG. 11, the processor 16 of the audio identification device 10 may be further configured to shut down the processing device 22 if the identified state of the processing device 22 is one of specified states in which shutdown of the at least one processing device is indicated. For example, the processor 16 may be configured to perform the processing as described below, referring to FIGS. 12 and 13.

Figure 12:
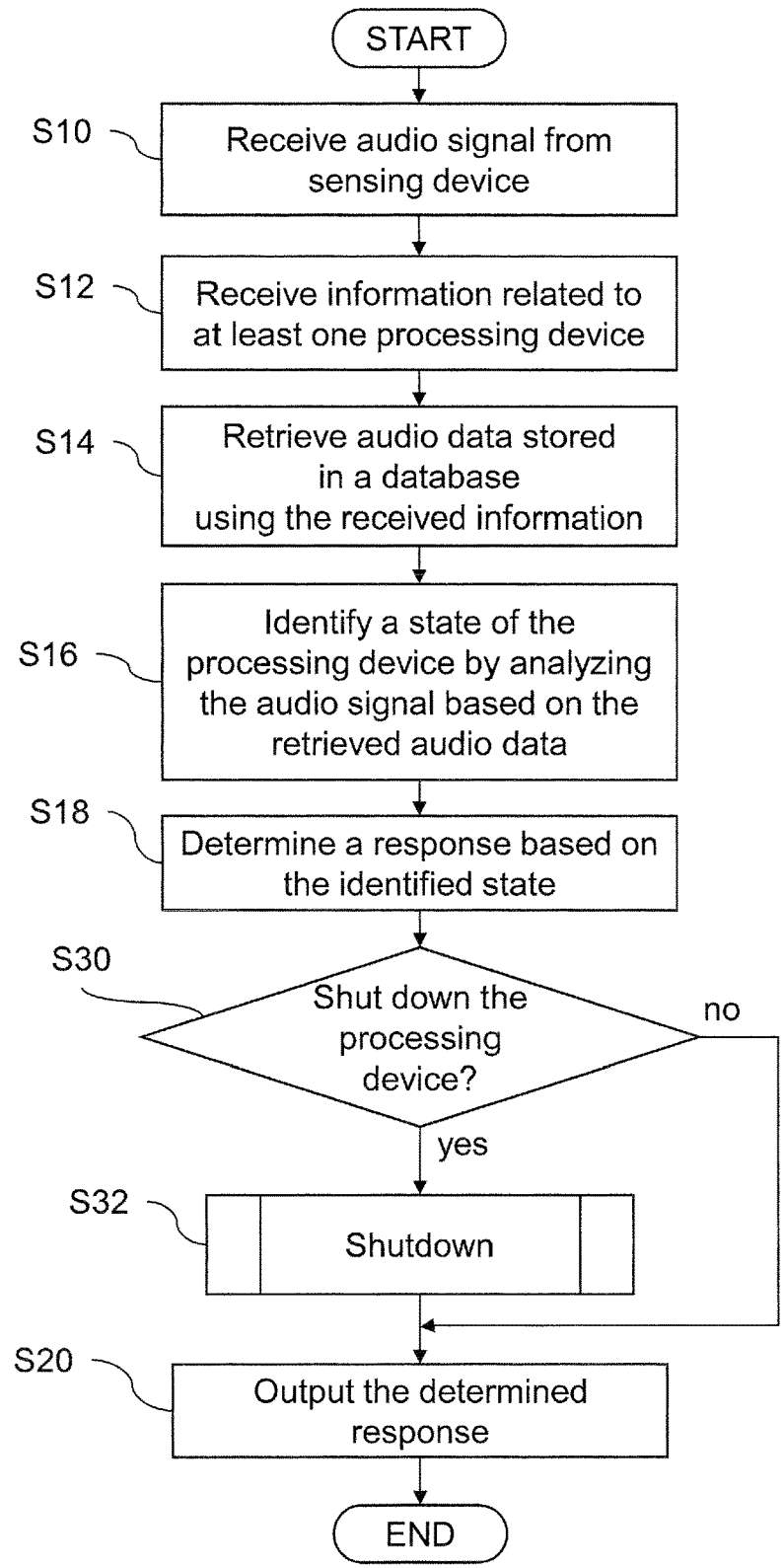
FIG. 12 shows a flowchart of exemplary processing performed by the processor of the audio identification device in case of the exemplary implementation shown in FIG. 11.

Steps S10 to S18 of the exemplary processing shown in FIG. 12 may be identical to the steps S10 to S18 of the exemplary processing shown in FIG. 6. After determining the response based on the identified state of the processing device 22 in step S18, the processing shown in FIG. 12 proceeds to step S30.

In step S30, the processor 16 determines whether or not shutdown of the processing device 22 is indicated in association with the identified state of the processing device 22. For example, one or more states may be previously specified as states in which the shutdown of the processing device 22 is advisable. The information indicating these states may be stored in the storage device (not shown) of the audio identification device 10 and/or in the database 40, for example. If the processor 16 determines that the identified state of the processing device 22 is not one of the specified states in which shutdown of the at least one processing device is indicated (no in step S30), the processing proceeds to step S20. If, however, the processor 16 determines that the identified state of the processing device 22 is one of the specified states in which shutdown of the at least one processing device is indicated (yes in step S30), the processing proceeds to step S30 to shut down the processing device 22.

Figure 13:
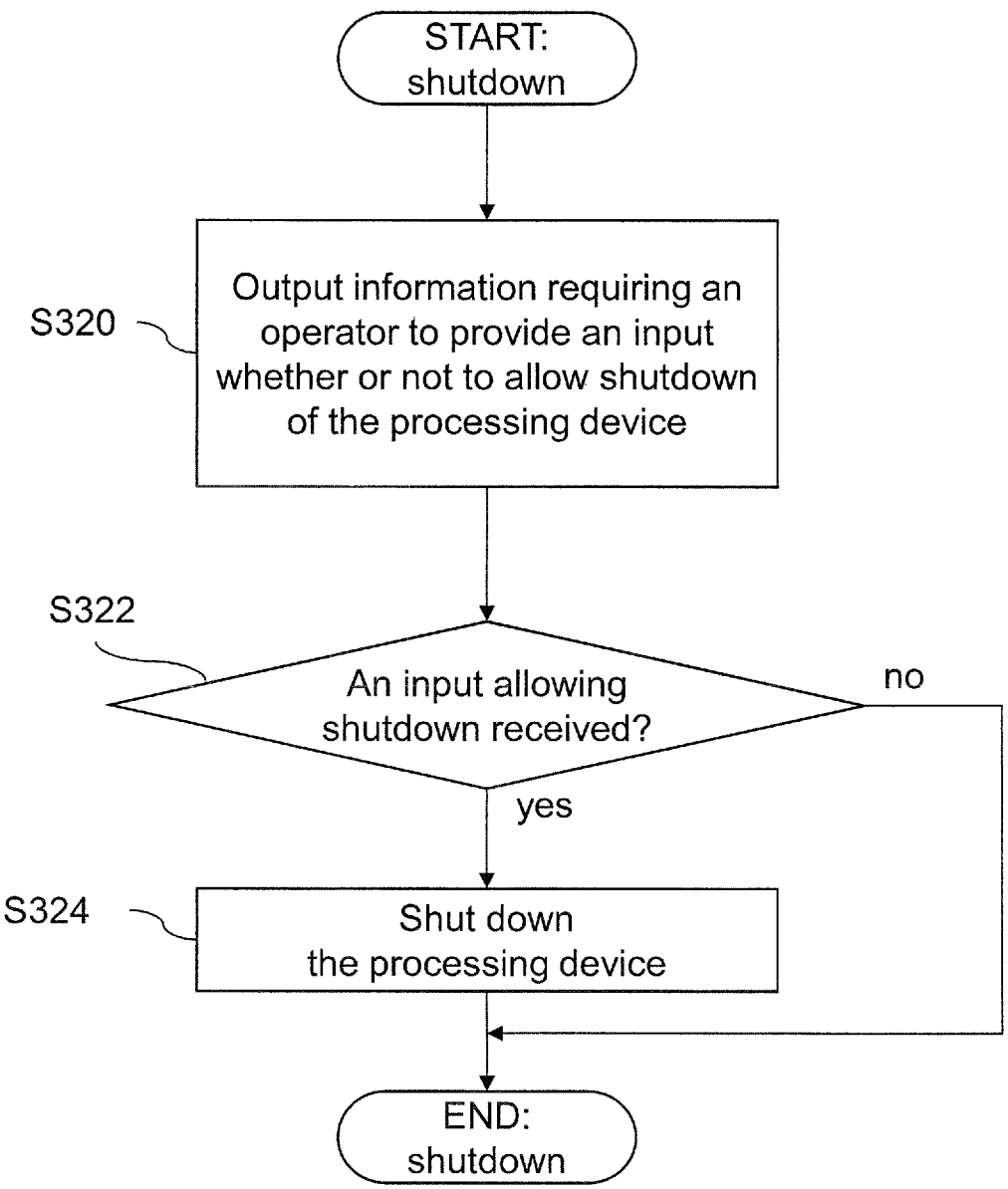
FIG. 13 shows a flowchart of exemplary processing for shutting down the processing device.

FIG. 13 shows a flowchart of exemplary detailed processing of step S30 shown in FIG. 12. When the processing proceeds to step S30 of FIG. 12, the processor 16 starts the processing shown in FIG. 13. The processing shown in FIG. 13 starts with step S320.

In step S320, the processor 16 outputs information requiring an operator to provide an input whether or not to allow shutdown of the processing device 22. For example, the processor 16 may output such information, via a wireless and/or wired communication network, to a device that is used by the operator and that is located outside the working space 26 of the processing setup 20. An example of such a device of the operator is a communication device, e.g. a mobile phone, of the operator, as illustrated above with reference to FIG. 11. In another example, the processor 16 may output the information in step S320 to the output device 18 included in the audio identification device 10. After step S320, the processing proceeds to step S322.

In step S322, the processor 16 determines whether or not an input allowing shutdown of the processing device 22 is received. The operator may receive the information output by the processor 16 and decide whether or not to allow shutdown of the processing device 22. The operator may give the input to the device which received the information from the processor 16 and the device may send the input back to the processor 16 via the wireless and/or wired communication network. In case the information is output in step S320 to the output device 18 included in the audio identification device 10, the operator may give the input to the audio identification device 10 via an input device (not shown) of the audio identification device 10.

If an input allowing the shutdown of the processing device is received (yes in step S322), the processing proceeds to step S324 and the processor 16 shuts down the processing device 22. The processor 16 may, for example, output a wireless signal instructing a wireless electric switch connecting the power source to the processing device 22 to cut the connection, as illustrated above in FIG. 11. After step S324, the processing shown in FIG. 13 ends and the processing proceeds to step S20 of FIG. 12.

If an input allowing shutdown of the processing device 22 is not received (no in step S322), the processing shown in FIG. 13 ends without performing step S324 and the processing proceeds to step S20 of FIG. 12. In step S322, the processor 16 may wait for a predetermined time period before determining that an input allowing shutdown is not received.

Referring again to FIG. 12, step S20 in which the determined response is output may be identical to step S20 of FIG. 6. The processor 16 may, however, further include in the response that the shutdown of the processing device 22 has been indicated, in case step S32 has been performed.

In the various examples described above, the identification module 162 of the processor 16 of the audio identification device 10 identifies a state indicating that a processing device 22 is in a normal state or in a mode of failure. Alternatively or in addition, the identification module 162 may identify steps in a sequence of installation and operation of the processing device 22 based on sounds from the processing device 22. Further, the response to be output may further include instructions for the operator on the installation and operation. In this example, the database 40 may store, in association with audio data of sounds induced by the processing device and/or with audio data of ambient sounds during operation of the processing device 22, steps in a sequence of installation and operation of the processing device. For instance, audio data of audio prompts from the processing device 22 such as a beep or sequence of beeps indicating the beginning or ending of a step may be stored in the database 40 in association with the information indicating that the processing device is in the beginning or ending of the step. Further, for example, audio data of ambient sounds associated with each step such as the agitation of a mixer or the addition of fluid from a pump may be stored in the database 40 in association with the information indicating that the processing device 22 is in that step. Based on such exemplary audio data stored in the database 40, the identification module 162 may identify the steps in a sequence of installation and operation of the processing device 22. Alternatively or in addition, the processing device 22 may emit an embedded audio signature indicating each step. The examples of the embedded audio signature may be either include, but not limited to, generation of a different audio frequency for each step and generation of an inaudible audio frequency for each step. The processor 16 may identify the step of installation and operation from the audio signature captured by the sensing device. The information indicating which audio signature corresponds to which step of installation and operation may be stored in the storage device (not shown) of the audio identification device 10 and/or in the database 40. Further, for example, the processing device 22 may identify the installation or operation step using a cooperative sensing device such as a visual sensing device, RFID reader or NFC reader and then output an audio signature indicating the identified step.

The above-described examples involve obtaining the identification information of the processing device 22. In yet other examples, identification information of components included in the processing device 22 may be obtained by the audio identification device 10, 10a. The components may be consumable components such as filters, bags, assemblies, subassemblies, sensors, etc. The "consumable" components may be understood as components that may wear out or be used up. Thus, the "consumable" components may have to be replaced regularly.

Figure 14:
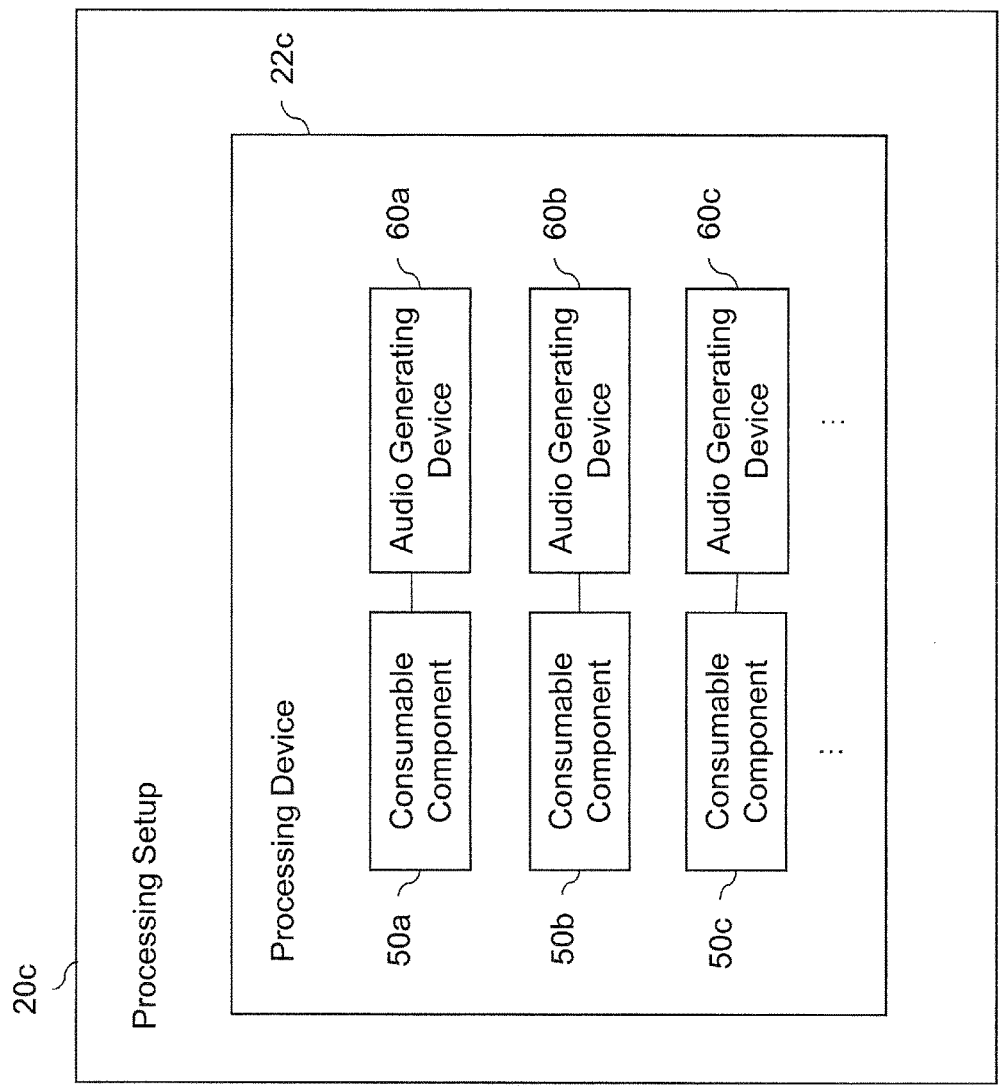
FIG. 14 shows another example of a functional block diagram of a processing setup.

FIG. 14 shows an example of a functional block diagram of a processing setup 20c comprising a processing device 22c including consumable components 50. The processing device 22c shown in FIG. 14 includes consumable components 50a, 50b and 50c. Each of the consumable components 50 may be provided with an audio generating device 60. It should be noted that, although FIG. 14 shows three consumable components 50a, 50b and 50c with corresponding audio generating device 60a, 60b and 60c, the processing device 22c may include less than three or more than three pairs of consumable component 50 and audio generating device 60.

Figure 15A:
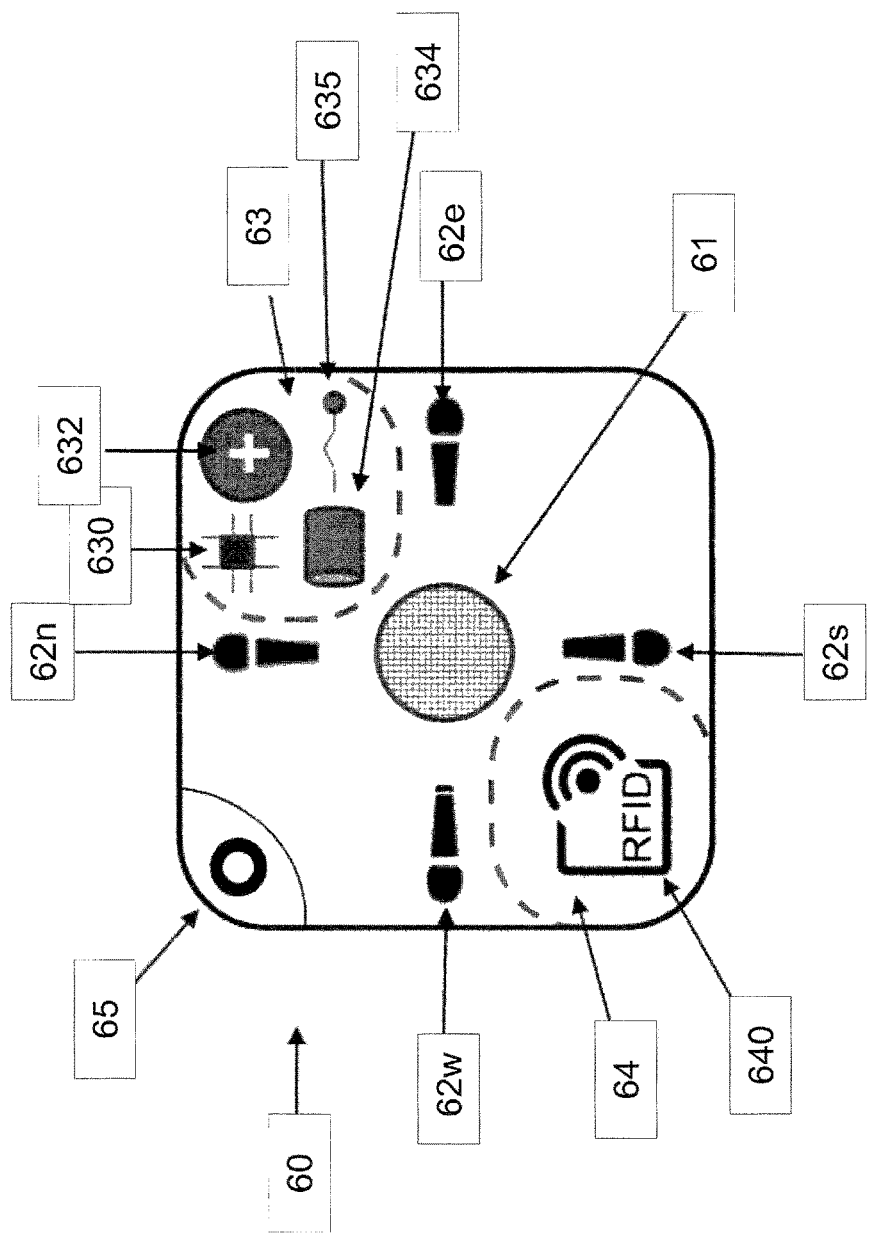
FIG. 15A shows an exemplary configuration of an audio generating device.

FIG. 15A shows an exemplary configuration of the audio generating device 60 shown in FIG. 14. The audio generating device 60 shown in FIG. 15A may include an audio emitting device 61, an array of sensing devices 62n, 62e, 62s, 62w, an internal computing device 63, a detection device 64 and an attachment device 65. The audio emitting device 61 may be, for example, a speaker. Each sensing device 62 in the array may be a microphone. The microphones may be positionally arranged microphones, for example, north microphone 62n, east microphone 62e, south microphone 62s, and west microphone 62w. The internal computing device 63 may include a processor 630, a power source 632, e.g. a battery, a memory storage device 634 and communication/network device 636. The detection device 64 may be configured to detect identification information of the consumable component on which the audio generating device 60 is provided. The detection device 64 may be, for example, an RFID reader 640. Alternatively, the detection device 64 may be a reader of a machine-readable code, such as barcode, QR code or datamatrix code. The attachment device 65 may be, for example, a cable zip tie or other attachment mechanism that enables the audio generating device 60 to be attached to the consumable component 50. Other examples of the attachment mechanism that may be employed as the attachment device may include, but not limited to, molded attachment, a connection device such as a clip, clamp, and a fastener such as an elastic band, cable tie, hook and loop fasteners (e.g. Velcro® or Duo-Lock®).

The processor 630 of the audio generating device 60 may be configured to emit an audio signal using the audio emitting device 61. For example, the processor 630 may generate an audio signal including information related to the consumable component 50 on which the audio generating device 60 is attached and instruct the audio emitting device 61 to emit the audio signal. The audio signal to be emitted by the audio emitting device 61 may include an audio signature indicating the identification information of the consumable component 50 detected by the detection device 64. The audio signal may also include information on connections between the corresponding consumable component 50 and other consumable component(s).

Figure 15B:
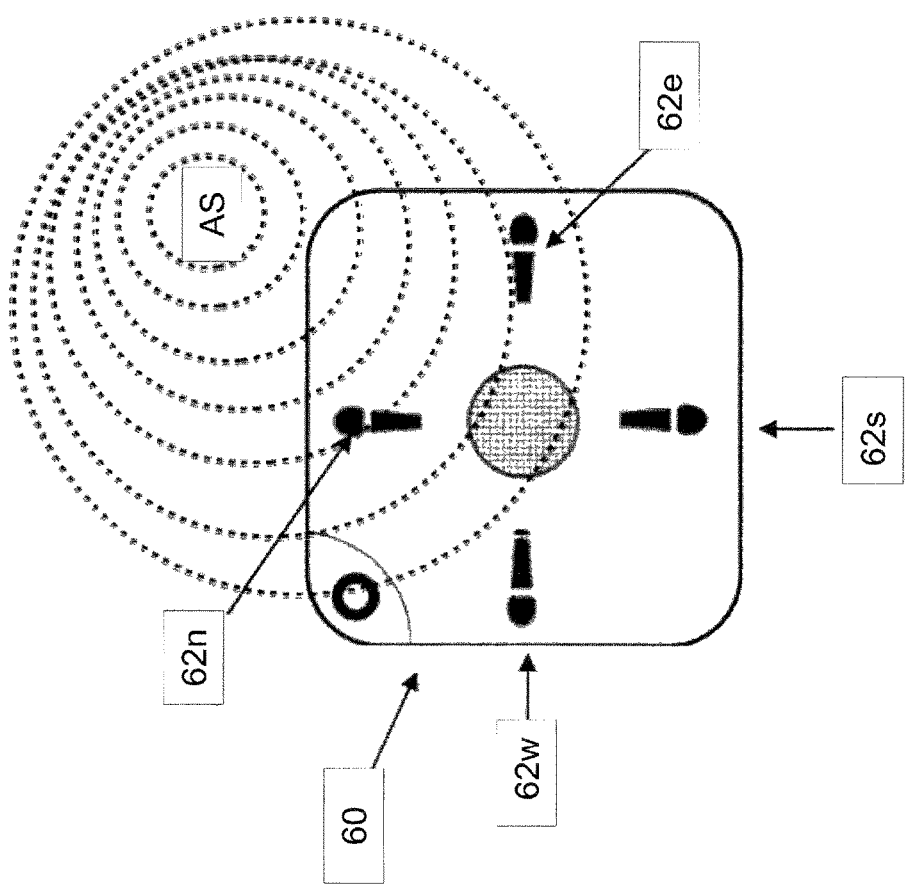
FIG. 15B shows an exemplary operation of the audio generating device.

The processor 630 may be further configured to identify directionality of an audio signal captured by the array of sensing devices 62. For example, by arranging the sensing devices 62 to be spaced apart as the north, east, south and west microphones 62n, 62e, 62s, 62w shown in FIG. 15A, the processor 632 may be configured to determine the time of flight for a sound to reach one microphone in the array versus the other microphones in the array. The processor 630 may be further configured to determine the directionality and distance of the source of the sound relative to the audio generating device 60 from the time of flight. For instance, as shown in FIG. 15B, suppose an audio signal AS first reaches the north microphone 62n and then followed by the east microphone 62e, west microphone 62w and finally by the south microphone 62s. The processor 632 may be configured to determine the directionality of the sound (in this example, northeast) based on the sequence of sound detection by the array of microphones 62. A known algorithm in the field of acoustic localization, such as Time Delay of Arrival (TDOA) localization, may be employed for determining the directionality of the sound using a microphone array. Other examples of the algorithm for acoustic localization may include, but not limited to, Steered Beamformer, Time Delay Estimation (TDE) and Dominant Frequency Selection (DFSE).

Accordingly, each of the audio generating devices 60 can present an audio signature to the audio identification device 10 to determine the presence of the corresponding consumable component 50, connections to other associated consumable components within an assembly, and the location of the corresponding consumable component 50 within the assembly. Each of the audio generating devices 60 can present an audio signature at a pre-determined and/or pre-programmed time interval based on the individual consumable component 50 it is attached to. The audio generating devices 60 can listen to the presentation of audio signatures from other audio generating devices 60 at different time intervals to determine the presence of other components in the assembly. As described above, the audio generating device 60 with a microphone array 62 can determine the distance of the other consumable components based on the time of flight delay for an audio signature to reach at one microphone on the microphone array and compare the time of flight to that for a second, third, fourth, or so on microphone in the microphone array. The microphones in the microphone array 62 can be arranged at the ends of the audio generating device 60, the attachment mechanism, or the consumable component 50 to more accurately determine the direction of the incoming audio signal from another audio generating device 60.

An orientation sensor may be located within the audio generating device and the orientation sensor can determine and signal the relative orientation (up, down, right, left, or at a defined angle in space) positioning of the consumable component. Distance and orientation of one audio generating device on a consumable component to another can also be determined by the audio generating device 60 based on the relative audio strength of signal.

The attachment of two consumable components 50 together can change or alter the presentation of the audio signature provided by the audio generating device 60. This is particularly the case for an audio generating device 60 attached to a connection device, such a sanitary tri-clamp to join two or more components. The audio generating device 60 may be further configured to adjust the time interval and/or frequency of the audio signature presentation based on the feedback of other nearby components. Multiple audio generating devices 60 can engage in several rounds of call and answer to determine the most efficient time intervals (propagation delays) and/or frequencies for each of them to present to the audio identification device 10 the presence of the consumable components 50, the status of the consumable components 50, and the locations of the consumable components 50 as a collective group in the most efficient manner. Markov chain models, pulse coupled synchronization, synchronization of oscillatory wait times, propagation delays, and other network signaling methods can be utilized to determine the presence, status, and location of all of the consumable components 50 in an assembly and/or workspace.

To conserve battery power of the audio identification device 10, e.g. a mobile device, the audio identification device 10 may be configured to present an audio signature (call and answer protocol) that can activate all of the audio generating devices 60 to present the audio signatures based on their assigned time intervals. Through repeated iterations of call and answer of the audio signatures and intelligent delay adjustments to the pre-programmed intervals the audio generating devices 60 can determine the outer most elements and work their way in to determine the location of all consumable components 50 in a workspace. The audio generating devices 60 can even determine which elements are next to one another on a different assembly line utilizing a different port. Through these multiple iterations of call and receive, a 3D diagram can be constructed within the audio identification device 10 detailing the relative locations of all the consumable components through emergence.

The audio generating device 60 may be attached to the consumable component 50 prior to sterilization of the consumable component. The sterilization may be made by, for example, gamma irradiation, autoclaving, heat treatment, a chemical sterilant such as Vaporized Hydrogen Peroxide (VHP), ethylene oxide (ETO), or other approved and validatable sterilization methods. The audio generating device 60 may include an appropriate shielding (not shown) for the electronics based on the sterilization method employed. Alternatively, the audio generating device 60 may be attached to the consumable component 50 after sterilization of the consumable component 50.

The audio generating device 60 may be single-use, that is, may be disposed along with the consumable component 50. Alternatively, the audio generating device 60 may be multi-use, that is, the audio generating device 60 may be removed from the consumable component 50 prior to discarding the consumable component 50. In case of multi-use, the audio generating device 60 may be attached to another consumable component 50 for further use after detached from a consumable component 50 to be discarded. To ensure the correct attachment of the proper multi-use audio generating device to the correct consumable component, the audio generating device and the attachment device may be coded, e.g. color coded or visually coded using symbols.

Figure 16A:
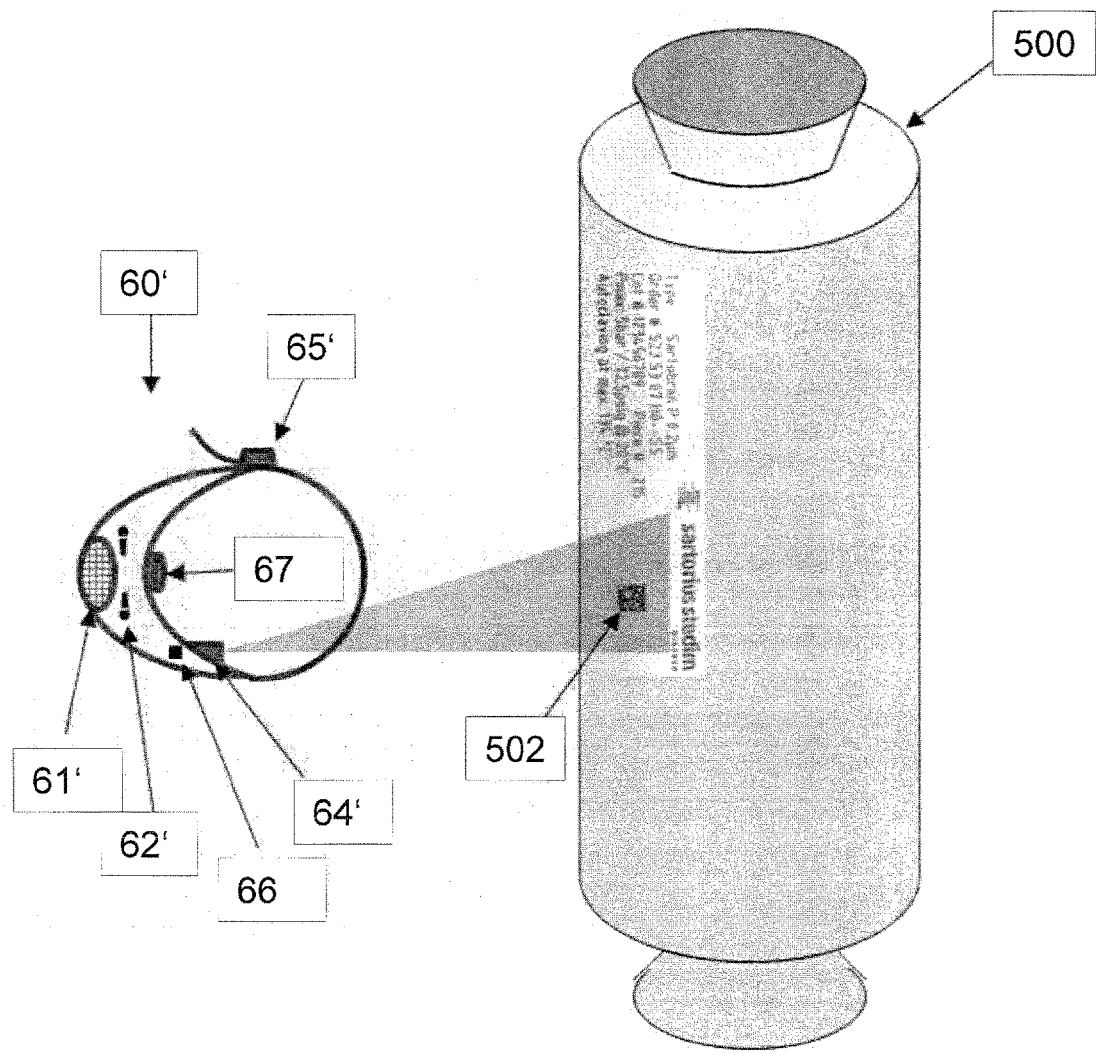
FIGS. 16A and 16B show an example of an implementation of the audio generating device provided on a consumable component.
Figure 16B:
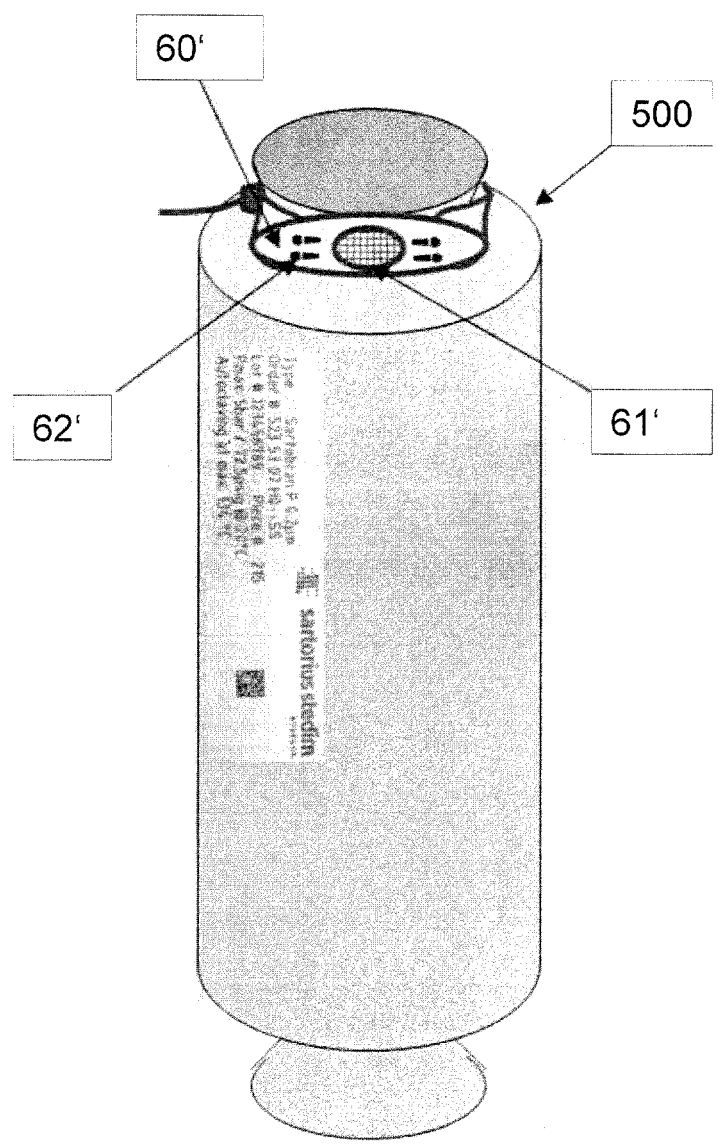

FIGS. 16A and 16B show an example of an implementation of an audio generating device provided on a consumable component to be included in a processing device. FIG. 16A shows an exemplary audio generating device 60' and a filter capsule 500. The filter capsule 500 is an example of the consumable component 50. The filter capsule 500 may be provided with a barcode 502 indicating the identification information of the consumable component 50. The audio generating device 60' includes an audio emitting device 61', an audio detection device array 62', a detection device 64', a detection device button 66 to activate the detection device 64', an attachment device 65', a button 67 for letting the audio generating device 60' know that it has been attached to an object, as well as an internal processing device, memory storage device, and power source (not shown). In this example, the audio emitting device 61' may be a speaker and the audio detection device array 62' may be an array of microphones. Further, the detection device 64' may be a barcode reader to detect the identification information of the consumable component 50 from a barcode provided on the consumable component 50, in this example, from the barcode 502 on the filter capsule 500. The detection device 64' may be activated by an operator by pressing the detection device button 66 to scan the barcode 502. The attachment device 65' may be a cable zip tie or other attachment mechanism. FIG. 16B shows the audio generating device 60' being attached to the filter capsule 500 using the attachment device 65'.

Figure 17:
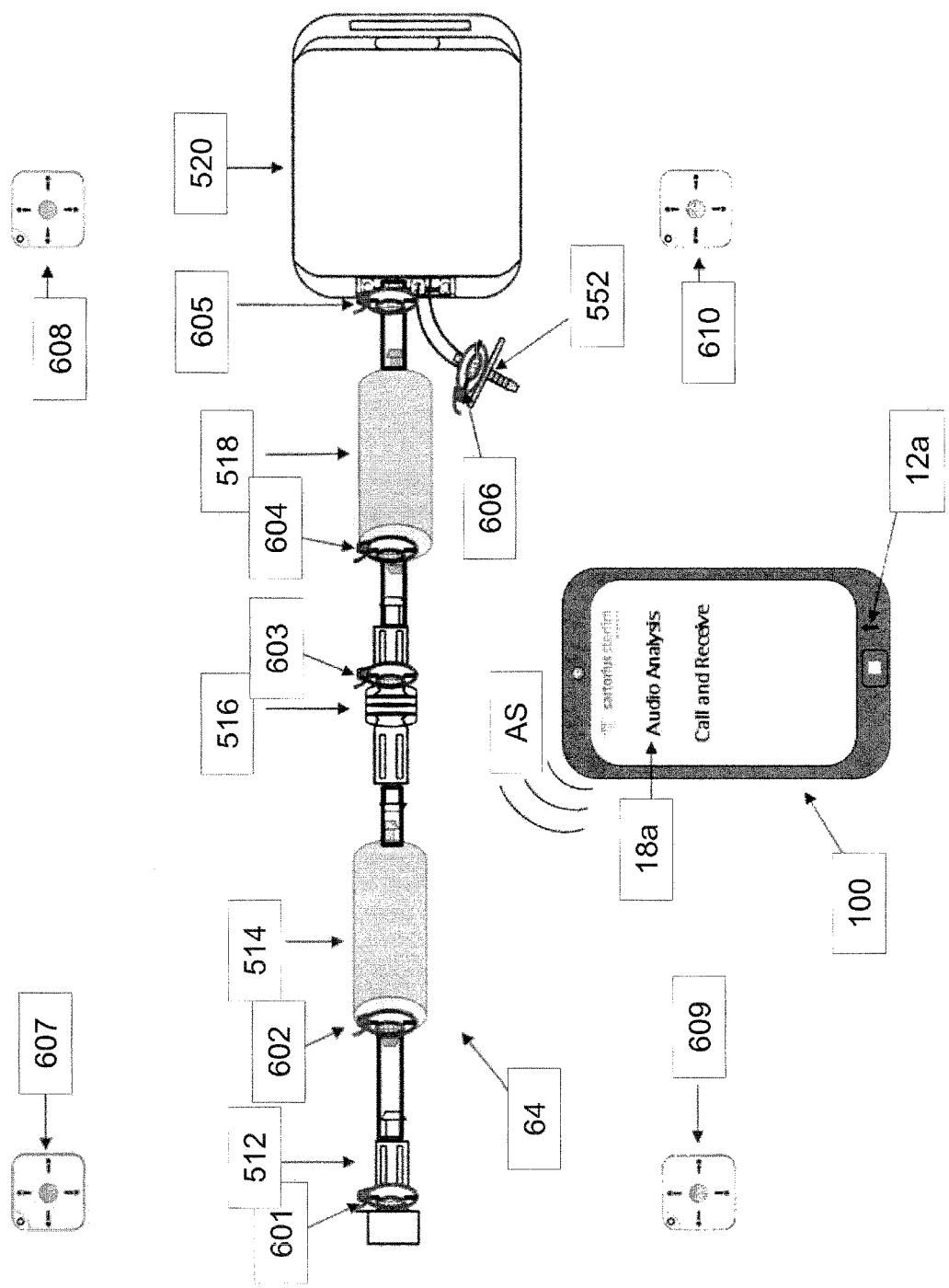
FIG. 17 shows an example of an implementation of the audio generating devices provided on consumable components.

FIG. 17 shows an example of an implementation of the audio generating devices provided on consumable components. The example shown in FIG. 17 is a pharmaceutical production assembly 510 of consumable components 50. These components may include an unconnected aseptic connector 512 on which an audio generating device 601. The unconnected aseptic connector 512 is connected to a pre-filter 514 via tubing. An audio generating device 602 is attached to the pre-filter 514. The pre-filter 514 is connected to a connected aseptic connector 516 via tubing. An audio generating device 603 is attached to the connected aseptic connector 516. The connected aseptic connector 516 is connected to a final sterilizing grade filter 518 via tubing. An audio generating device 604 is attached to the final sterilizing grade filter 518. The final sterilizing grade filter 518 is connected to a sterile bag 520 via tubing. An audio generating device 605 is attached to the sterile bag 520. The sterile bag 520 is connected to a sterile venting filter 522 via a different tubing port. An audio generating device 606 is attached to the sterile venting filter 522.

In the example shown in FIG. 17, the audio generating device used with an aseptic connector may be connected to the aseptic connector in such a way that the setup can determine if the aseptic connector is connected directly to another aseptic connector or if there is no connection made. This can be made by the two aseptic connectors comprising a completed shape that pushes on a button or region of the audio generating device. In this example, the audio generating device 601 can determine that the unconnected aseptic connector 512 is not connected to another aseptic connector. The audio generating device 603 can determine that the connected aseptic connector 516 is connected to another aseptic connector for a sterile connection. This information can be communicated to the audio identification device 10 which in this example is implemented on a mobile device 100.

In addition to the audio generating devices attached to the components described above referring to FIG. 17, a plurality of audio generating devices 607, 608, 609 and 610 may be mounted spaced apart at fixed positions in the working space of the processing setup including the pharmaceutical production assembly 510. For example, the audio generating devices 607, 608, 609 and 610 may be attached on a wall or on a fixed setup, apart from the pharmaceutical production assembly 510. The locations where the audio generating devices 607, 608, 609 and 610 are attached may be defined, e.g. in a GPS coordinate. The mounted audio generating devices 607, 608, 609 and 610 with known locations can provide a reference to determine through audio signals the locations of the other components with audio generating devices relative to the working space.

The audio generating devices shown in FIG. 17 can determine their spatial relationship with the other consumable components by generating an audio signal including the identification of the corresponding component at a predetermined interval. The other audio generating devices listen to the audio signal and determine the relative position compared to the other components based on the direction and time of flight of the signal captured at the microphone array. The audio generating devices can determine which components are at the ends first and work their way in through multiple iterations of audio signals from each of the components.

The mobile device 100 shown in FIG. 17 may be configured to initiate a call and receive program where an audio signal AS can be sent out to initiate the audio generating devices to determine their relative position to each other. The audio generating devices can then provide the information about each component and their relative position to one another using audio signals. The microphone 12a of the mobile device 100 captures the audio signals from the audio generating devices. Using the information provided using the audio signals from the audio generating devices, the mobile device 100 on which the audio identification device 10 is implemented may provide an operator with a 3D positional diagram of all of the components in the production setup along with information for assembly, connection, operation, associated documentation and troubleshooting.

The determination of the relative positions of the audio generating devices may be performed based on multiple rounds of audio signal presentations. An example of how such determination can be performed will be described below referring to FIG. 17.

When the mobile device 100 shown in FIG. 17 sends out an audio signal AS to the audio generating devices on each of the consumable components, the audio generating devices on the components may be activated and start their signaling. The audio signal AS from the mobile device 100 may be considered as a synchronization event. Each audio generating device on each of the components may be pre-programmed to have a pre-determined time interval in which the audio generating device outputs an audio signal including the identification of the corresponding component. The time intervals may be set using prime numbers so that audio signals from different audio generating devices do not overlap. For example, the time intervals for the audio generating devices 601, 602, 603, 604, 605 and 606 could be set to 11 ms, 31 ms, 13 ms, 37 ms, 23 ms and 41 ms, respectively. It should be noted, however, the values of time intervals may be set to different values than these exemplary values.

In the first round initiated by the audio signal AS from the mobile device 100, the audio generating devices on the components may perform initial audio signal presentations in the pre-determined time intervals to determine which components are present in the assembly. For example, the audio generating device 601 on the unconnected aseptic connector 512 may output an audio signal indicating that an unconnected aseptic connector is present, after the pre-determined time interval of 11 ms pre-programmed for the unconnected aseptic connector. Similarly, the audio generating device 602 on the pre-filter 514 may output an audio signal indicating that a pre-filter is present, after the pre-determined time interval of 13 ms pre-programmed for the pre-filter. The same may apply to audio generating devices 603, 604, 605 and 606. The audio generating devices may have a common delay cycle (for example, 100 ms) after the initial presentation of audio signals in the corresponding time intervals.

In the second round, the audio generating devices 601 and 605 respectively on the unconnected aseptic connector 512 and the sterile bag 520 that are located at the ends of the assembly may recognize that there are no components to one side of them based on the direction and Time Delay of Arrival (TDOA) of the microphone arrays of the audio generating devices 601. The audio generating devices 601 and 605 may add a larger delay (for example, 400 ms) between presentations of their audio signals to allow for the other audio generating devices to determine their positions.

In the third round, the audio generating devices 602, 603, 604 and 606 on components other than the unconnected aseptic connector 512 and the sterile bag 520 located at the ends of the assembly may determine their locations relative to the audio generating devices on the remaining components.

In the fourth round, the audio generating device 603 on the connected aseptic connector 516 that is located in the middle of the assembly may recognize that it is in the middle of the assembly.

In the fifth round, each of the audio generating devices 601 to 606 may reiterate outputting an audio signal indicating positioning thereof relative to other audio generating devices. For example, the audio generating device 601 may output an audio signal indicating that the unconnected aseptic connector 512 is at a position all the way to the left in the assembly. Further, for example, the audio generating device 602 may output an audio signal indicating that the pre-filter 514 is at a position second to the left in the assembly. The audio signals from the audio generating devices 601 to 606 may be captured by the microphone 12a of the mobile device 100 and then the mobile device 100 can provide a diagram of the location of all of the components. The audio generating devices 601 to 606 may turn the presentation feature off until they receive a next command from the mobile device 100.

Figure 18A:
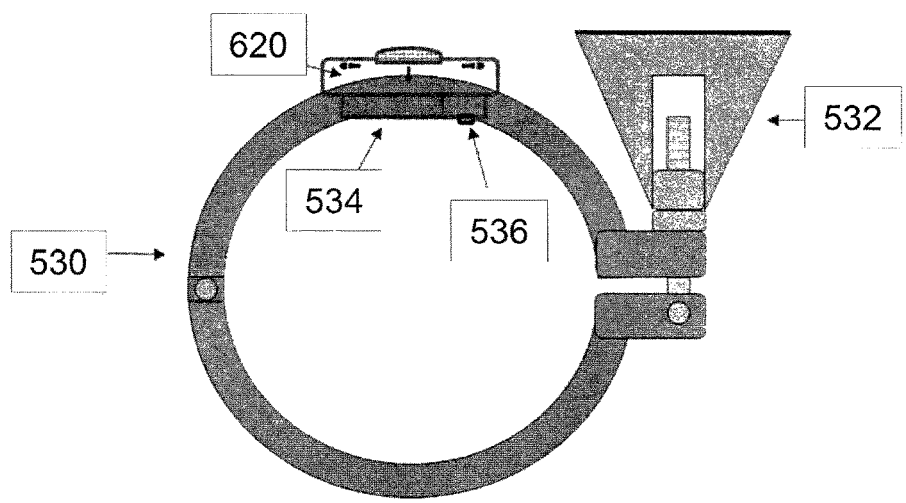
FIGS. 18A to 18C show examples of the audio generating devices integrated into closure.
Figure 18B:
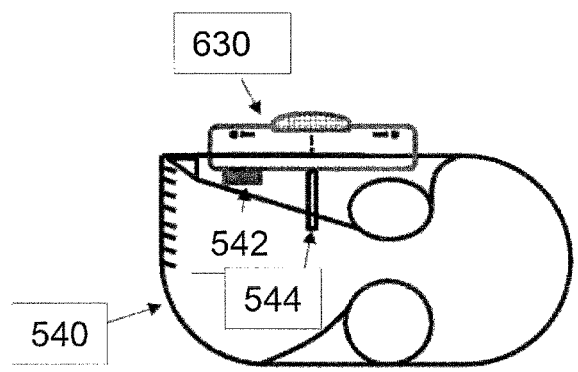
Figure 18C:
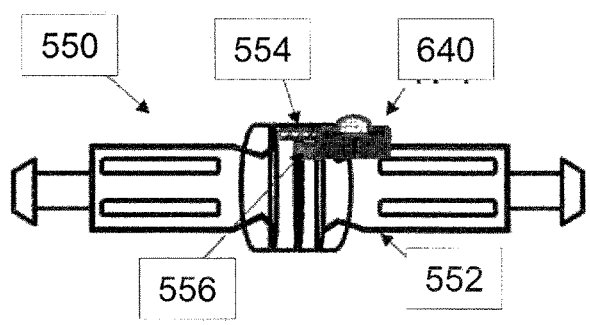

FIGS. 18A to 18C show examples of audio generating devices integrated into closure. FIG. 18A is shows a sanitary tri-clamp 530 connector with an integrated audio generating device 620. When the sanitary tri-clamp 530 is closed and the wing-nut latch 532 is tightened around an object, a pressure sensor 534 located on the interior of the clamp is depressed providing confirmation to the audio generating device 620 that the clamp has been closed and that the connection has been made. Additionally or alternatively, a button 536 on the interior of the clamp may be activated when the clamp has been closed around the object to provide confirmation to the audio generating device 620 that the connection has been made. The audio generating device 620 may broadcast an audio signal to the audio identification device 10 providing information about the adjoined components that were attached, that the connection was made successfully, and positional information on the location of the attached items relative to other components.

FIG. 18B shows a tube clamp 540 with an integrated audio generating device 630. When the tube clamp 540 is closed around a tubing, a pressure sensor 542 located on the interior of the tube clamp 540 is depressed, providing confirmation of closure to the audio generating device 630. Additionally or alternatively, an elongated button 544 on the interior of the tube clamp 540 can be activated when the tube clamp 540 has been closed around an object to provide closure confirmation to the audio generating device 630.

FIG. 18C shows an aseptic connector 550 connected to an aseptic connector 552 with an integrated audio generating device 640. When the aseptic connector 550 is attached to the aseptic connector 552 containing an integrated audio generating device 640, a pressure sensor 554 located on the interior of the aseptic connector 552 is depressed, providing confirmation of closure to the audio generating device 640. Additionally or alternatively, a button 556 on the aseptic connector 552 may be activated when the aseptic connector has been successfully attached to another aseptic connector to provide closure confirmation to the audio generating device 640.

The audio identification device 10, 10a and the audio generating device 28, 28b, 60 as described above may be sterilizable. The sterilization may be made for example, by gamma irradiation, steam sterilization, heat sterilization, microwave sterilization, chemical sterilization or other sterilization sources. The electronic components of the audio identification device and the audio generating device may be hardened by undergoing the sterilization.

Figure 19:
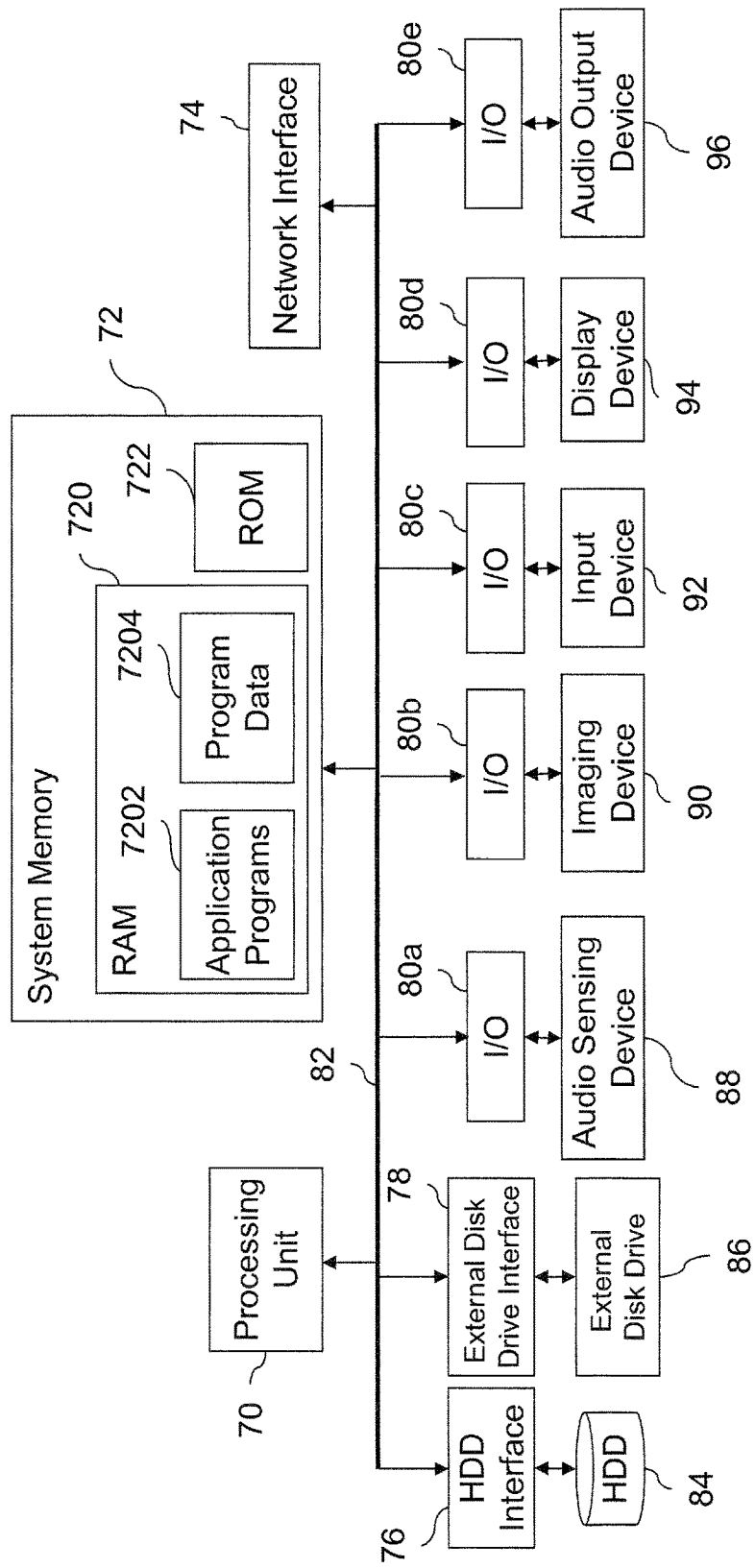
FIG. 19 show an exemplary hardware configuration of a computer that may be used to implement the audio identification device.

The examples of the audio identification device as described above may be implemented using a computer. The computer may be a general purpose computer such as a personal computer. Alternatively, the computer may be a computer incorporated in a mobile device such as a mobile phone, wearable device, PDA (personal digital assistant) or laptop computer. FIG. 19 show an exemplary hardware configuration of the computer that may be used to implement the audio identification device. The computer shown in FIG. 19 includes a processing unit 70, a system memory 72, a network interface 74, a hard disk drive (HDD) interface 76, an external disk drive interface 78 and input/output (I/O) interfaces 80. These components of the computer are coupled to each other via a system bus 82. The processing unit 70 may perform arithmetic, logic and/or control operations by accessing the system memory 72. The processing unit 70 may implement the processors of the exemplary audio identification devices described above. The system memory 72 may store information and/or instructions for use in combination with the processing unit 70. The system memory 72 may include volatile and non-volatile memory, such as a random access memory (RAM) 720 and a read only memory (ROM) 722. A basic input/output system (BIOS) containing the basic routines that helps to transfer information between elements within the general purpose computer, such as during start-up, may be stored in the ROM 722. The system bus 82 may be any of several types of bus structures including a memory bus or memory controller, a peripheral bus, and a local bus using any of a variety of bus architectures.

The computer may include a network interface 74 for communicating with other computers or devices via a network.

Further, the computer may include a hard disk drive (HDD) 84 for reading from and writing to a hard disk (not shown), and an external disk drive 86 for reading from or writing to a removable disk (not shown). The removable disk may be a magnetic disk for a magnetic disk drive or an optical disk such as a CD ROM for an optical disk drive. The HDD 84 and the external disk drive 86 are connected to the system bus 82 by a HDD interface 76 and an external disk drive interface 78, respectively. The drives and their associated computer-readable media provide non-volatile storage of computer-readable instructions, data structures, program modules and other data for the general purpose computer. The data structures may include relevant data for the implementation of the method for audio identification, as described herein. The relevant data may be organized in a database, for example a relational or object database.

Although the exemplary environment described herein employs a hard disk (not shown) and an external disk (not shown), it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk, ROM 722 or RAM 720, including an operating system (not shown), one or more application programs 7202, other program modules (not shown), and program data 7204. The application programs may include at least a part of the functionality as described above.

The computer may also include an audio sensing device 88 such as a microphone or a microphone array, an imaging device 90 such as a camera, an input device 92 such as mouse and/or keyboard, display device 94, such as liquid crystal display and an audio output device 96 such as a speaker. The audio sensing device 88, the imaging device 90, the input device 92, the display device 94 and the audio output device 96 may be connected to the system bus 82 via I/O interfaces 80a to 80e.

In addition or as an alternative to an implementation using a computer as shown in FIG. 19, a part or all of the functionality of the exemplary embodiments described herein may be implemented as one or more hardware circuits. Examples of such hardware circuits may include but are not limited to: Large Scale Integration (LSI), Reduced Instruction Set Circuits (RISC), Application Specific Integrated Circuit (ASIC) and Field Programmable Gate Array (FPGA).

The subject matter described in the application can be implemented as a method or as a system, possibly in the form of one or more computer program products. The subject matter described in the application can be implemented in a data signal or on a machine readable medium, where the medium is embodied in one or more information carriers, such as a CD-ROM, a DVD-ROM, a semiconductor memory, or a hard disk. Such computer program products may cause a data processing apparatus to perform one or more operations described in the application.

In addition, subject matter described in the application can also be implemented as a system including a processor, and a memory coupled to the processor. The memory may encode one or more programs to cause the processor to perform one or more of the methods described in the application. Further subject matter described in the application can be implemented using various machines.

What is claimed is:
1. An audio identification device for identifying a state of any one of a plurality of processing devices, an identification information indicator provided on the at least one processing device of the processing setup, the identification information indicator indicating the identification information of the at least one processing device, each of the processing devices having an audio generating device configured to output an audio signature indicating identification information of the respective processing device, an identification information detector operatively associated with the audio generating device and configured to detect the identification information indicated by the identification information indicator provided on the at least one processing device, the audio generating device outputs the audio signature indicating the identification information detected by the identification information detector, the audio identification device comprising:
  at least one sensing device configured to capture an audio signal present in a working space of a processing setup that includes the at least one processing device; and
  a processor configured to:
    receive the audio signature via the at least one sensing device;
    determine the identification information of the at least one processing device from the audio signature;
    retrieve audio data stored in a database using the received information related to the at least one processing device, including audio data stored in the data base in association with the identification information of the at least one processing device;
    identify a state of the at least one processing device by analyzing the audio signal captured by the at least one sensing device based on the retrieved audio data; and
    output a response, the response being determined based on the identified state of the at least one processing device.

2. The audio identification device of claim 1, wherein at least one of the processing devices further has optically readable identification information that identifies the respective processing device, the audio identification device further comprising:
  an optical device configured to read the optically readable identification information on the at least one processing device and to determine the identification information for the at least one processing device based on the read identification information; and
  wherein, the processor is configured to:
    receive information related to the at least one processing device, including the audible or optical identification information of the at least one processing device.

3. The audio identification device according to claim 2, wherein:
  the audio generating device is a resonator configured to emit a baseline harmonic sound; and
  the processor is further configured to:
    determine the identification information of the at least one processing device from the baseline harmonic sound.

4. The audio identification device according to claim 1, wherein:
  the optically readable identification information is an identification information indicator on the at least one processing device of the processing setup, the identification information indicator indicating the identification information of the at least one processing device; and
  the optical reader is configured to detect the identification information indicated by the identification information indicator provided on the at least one processing device.

5. The audio identification device according to claim 1, wherein:
  the optical device is an imaging device configured to capture an image of the at least one processing device of the processing setup, and
  the optically readable identification information is defined by a configuration of the at least one processing device, and
  wherein the processor is further configured to:
    receive the image of the at least one processing device, captured by the imaging device; and
    determine the identification information of the at least one processing device from the received image of the at least one processing device.

6. The audio identification device according to claim 2, wherein the processor is further configured to:
  generate an audio data file from the audio signal captured by the at least one sensing device; and
  storing the generated audio data file in the database.

7. The audio identification device according to claim 6, wherein the processor is further configured to:
  output the generated audio data file as at least one of audio and visual representation.

8. The audio identification device according to claim 2, wherein the processor is further configured to:
  shut down the processing device if the identified state of the at least one processing device is one of specified states in which shutdown of the at least one processing device is indicated.

9. The audio identification device according to claim 2, wherein the response output includes information regarding one or more required actions by an operator.

10. The audio identification device according to claim 9, wherein:
  the one or more required actions by an operator includes providing an input indicating whether or not to allow shutdown of the processing device; and
  the processor is further configured to:
    receive the input by the operator; and
    shut down the processing device if the received input indicates that the operator allows shutdown of the processing device.

11. The audio identification device according to claim 2, wherein:
  the analyzing of the audio signal captured by the at least one sensing device includes performing a similarity search on the retrieved audio data; and
  the response includes a percentage of confidence for the identified state of the at least one processing device, based on results of the similarity search.

12. The audio identification device according to claim 2, wherein the audio identification device is sterilizable.

13. The audio identification device according to claim 2, wherein the audio identification device is implemented on a mobile device.

14. The audio identification device according to claim 2, wherein the audio identification device is included in the processing device of the processing setup.

15. An audio identification device comprising:
  at least one sensing device configured to capture an audio signal present in a working space of a processing setup including at least one processing device; and
  a processor configured to:
    receive information related to the at least one processing device;
    retrieve audio data stored in a database using the received information related to the at least one processing device;

identify a state of the at least one processing device by analyzing the audio signal captured by the at least one sensing device based on the retrieved audio data; and output a response, the response being determined based on the identified state of the at least one processing device, wherein the at least one processing device of the processing setup includes a plurality of components, each of the plurality of components being provided with an audio generating device, the audio generating device comprising:

an array of sensing devices configured to capture an audio signal present in the working space of the processing setup;

an audio emitting device configured to emit audio signals;

a processor configured to:
identify directionality of the audio signal captured by the array of sensing devices;
generate positional information including a relative position of the component on which the audio generating device is provided using the identified directionality; and
instruct the audio emitting device to emit an audio signal including the generated positional information and identification information of the component on which the audio generating device is provided; and the processor of the audio identification device is further configured to:
identify positions of the plurality of components by extracting the positional information and the identification information of each of the plurality of components from the audio signal emitted from the audio generating device provided on each of the plurality of components.

16. An audio identification method for identifying a state of any one of a plurality of processing devices, an identification information indicator provided on each of the processing device, the identification information indicator indicating the identification information of the processing device, each of the processing devices having an audio generating device configured to output an audio signature indicating identification information that identifies the respective processing device, an identification information detector operatively associated with the audio generating device and configured to detect the identification information indicated by the identification information indicator provided on the at least one processing device, the audio generating device outputs the audio signature indicating the identification information detected by the identification information detector, the method comprising:

using at least one sensing device to capture the audible identification information for at least one of the processing devices and determining the identification information for the at least one processing device based on the audible identification information;

capturing, by the at least one sensing device, an audio signal present in a working space of a processing setup that includes the at least one processing device;

receiving, by a processor, information related to the at least one processing device based on the identification information of the at least one processing device as determined by the audible identification information read by the at least one sensing device;

retrieving, by the processor, audio data stored in a database using the received information related to the at least one processing device, including retrieving audio data stored in the data base in association with the identification information of the at least one processing device;

identifying, by the processor, a state of the at least one processing device by analyzing the audio signal captured by the at least one sensing device and the retrieved audio data; and outputting, by the processor, a response that is determined based on the identified state of the at least one processing device.

17. An audio identification system comprising:
an audio identification device comprising at least one sensing device and a processor; and
a plurality of audio generating devices, each of the plurality of audio generating devices being provided on one of a plurality of components included in at least one processing device of a processing setup, wherein:
each of the audio generating devices comprises:
an array of sensing devices configured to capture an audio signal present in a working space of the processing setup;
an audio emitting device configured to emit audio signals;
a processor configured to:
identify directionality of the audio signal captured by the array of sensing devices;
generate positional information including a relative position of the component on which the audio generating device is provided using the identified directionality; and
instruct the audio emitting device to emit an audio signal including the generated positional information and identification information of the component on which the audio generating device is provided;

the at least one sensing device of the audio identification device is configured to:
capture an audio signal present in the working space of the processing setup; and the processor of the audio identification device is configured to:
identify positions of the plurality of components by extracting the positional information and the identification information of each of the plurality of components from the audio signal emitted from the audio generating device provided on each of the plurality of components.

* * * * *